(12) United States Patent
Kusunoki et al.

(10) Patent No.: US 10,075,021 B2
(45) Date of Patent: Sep. 11, 2018

(54) WIRELESS POWER TRANSMISSION SYSTEM FOR TRANSMITTING ALTERNATING-CURRENT POWER WIRELESSLY

(71) Applicant: FURUKAWA ELECTRIC CO., LTD., Tokyo (JP)

(72) Inventors: Masahiro Kusunoki, Tokyo (JP); Mitsuru Masuda, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 387 days.

(21) Appl. No.: 14/813,069

(22) Filed: Jul. 29, 2015

(65) Prior Publication Data
US 2015/0333538 A1 Nov. 19, 2015

Related U.S. Application Data

(63) Continuation of application No. PCT/JP2013/084673, filed on Dec. 25, 2013.

(30) Foreign Application Priority Data

Jan. 31, 2013 (JP) .................. 2013-017779

(51) Int. Cl.
*H02J 5/00* (2016.01)
*H02J 50/12* (2016.01)
(Continued)

(52) U.S. Cl.
CPC ............ *H02J 50/12* (2016.02); *H02J 7/025* (2013.01); *H02J 17/00* (2013.01); *H02J 50/05* (2016.02);
(Continued)

(58) Field of Classification Search
CPC . H02J 5/005; H02J 50/05; H02J 17/00; H04B 5/0037; H04B 5/0012
See application file for complete search history.

(56) References Cited

U.S. PATENT DOCUMENTS 9,531,442 B2 * 12/2016 Ichikawa ............. H04B 5/0037
9,824,817 B2 * 11/2017 Kusunoki ............... H02J 50/50
(Continued)

FOREIGN PATENT DOCUMENTS

JP H8-340285 12/1996
JP 2012-213322 11/2012
(Continued)

OTHER PUBLICATIONS

International Search Report dated Mar. 18, 2014 for International Application No. PCT/JP2013/084673, 5 pages.

*Primary Examiner* — Jared Fureman
*Assistant Examiner* — Michael Warmflash
(74) *Attorney, Agent, or Firm* — Amin, Turocy & Watson, LLP

(57) ABSTRACT

[OBJECT] There is provided a wireless power transmission system capable of transmitting power efficiently even when there is an obstacle or the like.
[ORGANIZATION] A power transmission device has a first and a second electrode (111, 112), a first and a second connection line (115, 116), and a first inductor (113, 114). A power reception device has a third and a fourth electrode (121, 122), a third and a fourth connection line (125, 126), and a second inductor (123, 124). At least one of the first to the fourth electrode is housed in a conductive casing (310, 320) having an opening corresponding to an opposing electrode, and a resonance frequency of a power transmission coupler constituted of the first and the second electrode and the first inductor (113, 144) and a resonance frequency
(Continued)

of a power reception coupler constituted of the third and the fourth electrode and the second inductor (123, 124) are set to be substantially equal.

8 Claims, 50 Drawing Sheets

(51) Int. Cl.
    *H02J 7/02*         (2016.01)
    *H02J 50/80*      (2016.01)
    *H02J 17/00*      (2006.01)
    *H04B 5/00*       (2006.01)
    *H02J 50/05*      (2016.01)

(52) U.S. Cl.
    CPC ............ *H02J 50/80* (2016.02); *H04B 5/0012* (2013.01); *H04B 5/0037* (2013.01)

(56) References Cited

U.S. PATENT DOCUMENTS

| | | | |
|---|---|---|---|
| 2009/0302690 A1* | 12/2009 | Kubono | H02J 17/00 307/109 |
| 2012/0019076 A1* | 1/2012 | Urano | H04B 5/0037 307/104 |
| 2012/0146431 A1* | 6/2012 | Ichikawa | H02J 7/025 307/149 |
| 2012/0146574 A1* | 6/2012 | Ichikawa | H02J 7/025 320/107 |
| 2012/0299392 A1* | 11/2012 | Ichikawa | H02J 5/005 307/109 |
| 2013/0002048 A1* | 1/2013 | Ichikawa | H02M 5/10 307/149 |
| 2013/0009488 A1* | 1/2013 | Choe | H02J 5/005 307/104 |
| 2014/0327321 A1* | 11/2014 | Kusunoki | H01F 38/14 307/104 |
| 2015/0333539 A1* | 11/2015 | Kusunoki | H02J 5/005 307/104 |

FOREIGN PATENT DOCUMENTS

| | | | | |
|---|---|---|---|---|
| JP | 2012-530480 | 11/2012 | | |
| WO | WO 2010150317 A1 * | 12/2010 | ............. | H02J 7/025 |
| WO | WO 2010150318 A1 * | 12/2010 | ............. | H02J 7/025 |
| WO | 2011-148803 | 12/2011 | | |
| WO | 2013-001569 | 1/2013 | | |

\* cited by examiner

DISPLACEMENT dx [mm] IN X DIRECTION OF POWER RECEPTION COUPLER RELATIVE TO POWER TRANSMISSION COUPLER

WIRELESS POWER TRANSMISSION SYSTEM FOR TRANSMITTING ALTERNATING-CURRENT POWER WIRELESSLY

CROSS-REFERENCE TO RELATED APPLICATIONS

This application is a continuation application of, and claims priority to, International Application No. PCT/JP2013/084673, filed Dec. 25, 2013 and entitled "WIRELESS POWER TRANSMISSION SYSTEM", which claims priority to Japanese Patent Application No. 2013-017779, filed Jan. 31, 2013, the disclosures of each of which are incorporated herein by reference in their entireties.

TECHNICAL FIELD

The present invention relates to a wireless power transmission system.

BACKGROUND ART

Patent Document 1 discloses a wireless power transmission device which performs transmission of power between two non-contact electric circuits by using electromagnetic induction.

PRIOR ART DOCUMENT

Patent Document

Patent Document 1: Japanese Patent Application Laid-open No. H8-340285

SUMMARY OF THE INVENTION

Problems to be Solved by the Invention

Incidentally, in the technology disclosed in Patent Document 1, power loss in a coil for transmitting power is large, and thus there is a problem that power cannot be transmitted efficiently. Further, when an obstacle such as a magnetic body or the like exists in the vicinities of coils on a power transmission side and a power receiving side, there is a problem that characteristics changes and power cannot be transmitted efficiently.

Accordingly, it is an object of the present invention to provide a wireless power transmission system capable of transmitting power efficiently even when there is an obstacle or the like.

Means for Solving the Problems

In order to solve the above problems, according to the present invention, in a wireless power transmission system transmitting alternating-current power wirelessly from a power transmission device to a power reception device, the power transmission device includes: a first and a second electrode which are disposed across a predetermined distance; a first and a second connection line electrically connecting the first and the second electrode and two output terminals of an alternating-current power generating unit, respectively; and a first inductor residing between the first and the second electrode and at least one of the two output terminals of the alternating-current power generating unit, and the power reception device includes: a third and a fourth electrode which are disposed across a predetermined distance; a third and a fourth connection line electrically connecting the third and the fourth electrode and two input terminals of a load, respectively; and a second inductor residing between the third and the fourth electrode and at least one of the two input terminals of the load, wherein at least one of the first to the fourth electrode is housed in a conductive casing having an opening corresponding to an opposing electrode, and a resonance frequency of a power transmission coupler constituted of the first and the second electrode and the first inductor and a resonance frequency of a power reception coupler constituted of the third and the fourth electrode and the second inductor are set to be substantially equal.

With such a structure, power can be transmitted efficiently even when there is an obstacle or the like.

Further, in one aspect of the present invention, the first and the second electrode constituting the power transmission coupler are juxtaposed across a predetermined distance on a first plane, and a total width including the predetermined distance is less than or equal to $\lambda/2\pi$ as a near field; the third and the fourth electrode constituting the power reception coupler are juxtaposed across a predetermined distance on a second plane in parallel to the first plane, and a total width including the predetermined distance is less than or equal to $\lambda/2\pi$ as a near field; and at least one of the power transmission coupler and the power reception coupler is housed in the casing, and two electrodes constituting the coupler housed in the casing are disposed in the opening of the casing.

With such a structure, by reducing a spread of electric field from rear surfaces of electrodes by the casing, the influence by an obstacle such as a ground plate can be suppressed.

Further, in one aspect of the present invention, the first to the fourth electrode have a same rectangular shape, two sides having a same length of the first electrode and the second electrode are disposed to oppose each other, and two sides having a same length of the third electrode and the fourth electrode are disposed to oppose each other; when a length of the casing in a direction from the first electrode to the second electrode is DB, a length in a direction orthogonal to the direction from the first electrode to the second electrode is LB, a depth from the opening to a bottom surface is PB, and a distance from the bottom surface to the electrodes is d3; and a length of the coupler housed in the casing in a direction from the first electrode to the second electrode is D, a length in a direction orthogonal to the direction from the first electrode to the second electrode is L, and a distance between the power transmission/reception couplers is d2, the following expressions hold true among them: DB≥1.2×D, LB≥1.3×L, and PB≥d3≥d2/2.

With such a structure, the influence by an obstacle can be reduced, and changes in transmission characteristics can be reduced.

Further, in one aspect of the present invention, the second and the fourth electrode each have an annular shape and are disposed in parallel to oppose each other, the first electrode is disposed in a hollow part of the annular shape of the second electrode, and the third electrode is disposed in a hollow part of the annular shape of the fourth electrode; and at least one of the power transmission coupler and the power reception coupler is housed in the casing, and two electrodes housed in the casing are disposed in the opening of the casing.

With such a structure, the influence by an obstacle can be reduced, and power can be transmitted efficiently even when it is rotated.

Further, in one aspect of the present invention, when an inside radius of the casing is RB, a depth from the opening to the bottom surface is PB, a distance from the bottom surface to the electrodes is d3, a radius of the electrodes having an annular shape of the coupler housed in the casing is R, a depth from the opening to the bottom surface is P, and a distance between the power transmission/reception couplers is d2, the following expressions hold true among them: RB≥1.1×R, and PB≥d3≥d2/2.

With such a structure, the influence by an obstacle can be reduced, and changes in transmission characteristics can be reduced.

Further, in one aspect of the present invention, the first and the second electrode constituting the power transmission coupler are disposed in parallel to oppose each other across a predetermined distance, and the predetermined distance is less than or equal to $\lambda/2\pi$ as a near field; the third and the fourth electrode constituting the power reception coupler are disposed in parallel to oppose each other across a predetermined distance, the predetermined distance is less than or equal to $\lambda/2\pi$ as a near field, and the third electrode is disposed in parallel to oppose the first electrode; and at least one of the power transmission coupler and the power reception coupler is housed in the casing, one of two electrodes housed in the casing is disposed in the opening of the casing, and the other is connected electrically to the casing.

With such a structure, the influence by an obstacle can be reduced, and power can be transmitted efficiently even when it is rotated.

Further, in one aspect of the present invention, the casing is constituted of aluminum or copper.

With such a structure, a spread of electric field can be reduced efficiently, and thereby the influence of an obstacle can be securely prevented.

Further, in one aspect of the present invention, there is provided a radome constituted of a dielectric on the opening of the casing.

With such a structure, the electrodes can be protected from physical forces and corrosion.

Further, in one aspect of the present invention, there is provided a fixing member fixing the couplers to the casing.

With such a structure, changes in characteristics due to fluctuation in electrodes can be prevented.

Effect of the Invention

According to the present invention, it becomes possible to provide a wireless power transmission system capable of transmitting power efficiently even when there is an obstacle or the like.

BEST MODE FOR CARRYING OUT THE INVENTION

Next, embodiments of the present invention will be described.

(A) Description of a Wireless Transmission System Utilizing Series Resonance

Hereinafter, a wireless power transmission system utilizing series resonance will be described, and thereafter embodiments of the present invention will be described.

Figure 1:
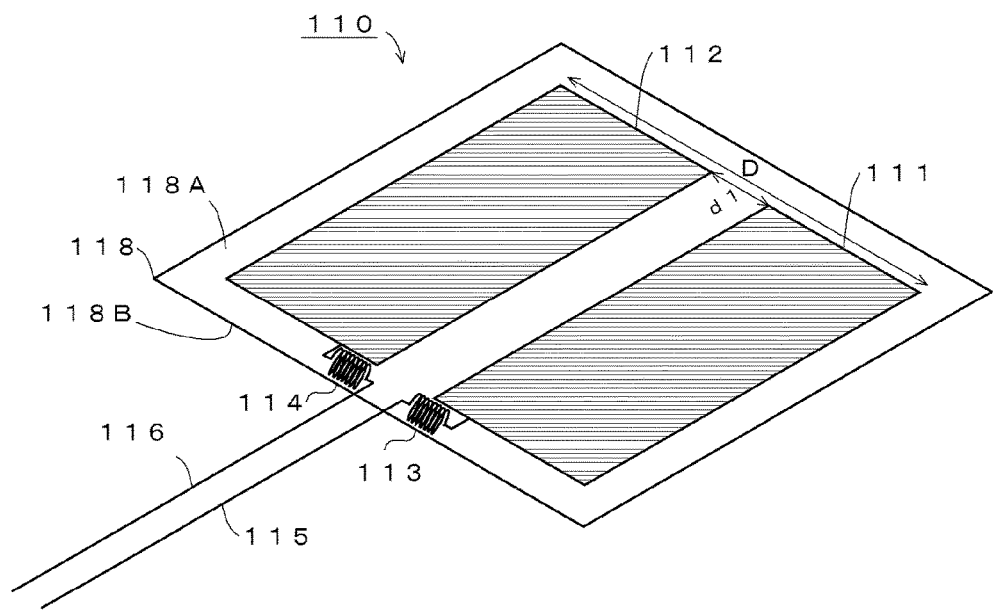
FIG. 1 is a view illustrating a detailed structural example of a power transmission device constituting a wireless power transmission system utilizing series resonance.

FIG. 1 illustrates a detailed structural example of a power transmission coupler constituting a wireless power transmission system utilizing series resonance. As illustrated in this view, in the wireless power transmission system utilizing series resonance, a power transmission coupler 110 is formed by disposing electrodes 111, 112 constituted of a conductive member having a rectangular shape on a front surface 118A of a circuit board 118 constituted of an insulating member (dielectric substrate) having a rectangular plate shape. On a rear surface 118B of the circuit board 118, in this example of FIG. 1, electrodes and so on are not disposed. As a specific structural example, for example, on the circuit board 118 constituted of a glass epoxy substrate, a glass composite substrate, or the like, the electrodes 111, 112 are formed of a conductive thin film of copper or the like. The electrodes 111, 112 are disposed in parallel at positions separated by a predetermined distance d1. Further, a width D of the electrodes 111, 112 including the distance d1 is set to be narrower than a near field denoted by $\lambda/2\pi$ where $\lambda$ is a wavelength of electric fields emitted from these electrodes.

Ends of inductors 113, 114 are connected to ends in a lateral direction of the electrodes 111, 112, respectively, of the circuit board 118. Further, other ends of the inductors 113, 114 are connected to one ends of connection lines 115, 116, respectively. The connection lines 115, 116 are disposed to avoid areas of the electrodes 111, 112 and an area sandwiched between them, and are also disposed to extend in a direction to depart from these areas (leftward and downward direction in FIG. 1). More particularly, they are disposed to avoid respective rectangular areas of the electrodes 111, 112 and the area sandwiched between these two electrodes 111, 112, and also disposed to extend in the direction to depart from these areas. By disposing in this manner, interference between the electrodes 111, 112 and the connection lines 115, 116 is decreased, and thus decrease in transmission efficiency can be prevented. The connection lines 115, 116 are, for example, constituted of a coaxial cable or a balanced cable. Note that other ends of the connection lines 115, 116 are connected respectively to output terminals of a not-illustrated alternating-current power generating unit. By connecting the alternating-current power generating unit to the power transmission coupler 110 by the connection lines 115, 116, a power transmission device is constituted.

The power transmission coupler 110 constitutes a series resonance circuit with capacitance C of a capacitor formed by disposing the electrodes 111, 112 across the predetermined distance d1 and inductance L of the inductors 113, 114, and thus has a peculiar resonance frequency $f_c$ due to them.

A power reception coupler 120 has the same structure as the power transmission coupler 110, and is formed by disposing electrodes 121, 122 constituted of a conductive member having a rectangular shape and inductors 123, 124 on a front surface 128A of a circuit board 128, and connecting connection lines 125, 126 to other ends of the inductors 123, 124. A resonance frequency $f_c$ of a series resonance circuit due to capacitance C of a capacitor formed by the electrodes 121, 122 and inductance L of the inductors 123, 124 is set to be substantially the same as that of the power transmission coupler 110. The connection lines 125, 126 are, for example, constituted of a coaxial cable or a balanced cable. A not-illustrated load is connected to other ends of the connection lines 125, 126 of the power reception coupler 120. By connecting the load to the power reception coupler 120 by the connection lines 125, 126, a power reception device is constituted.

Figure 2:
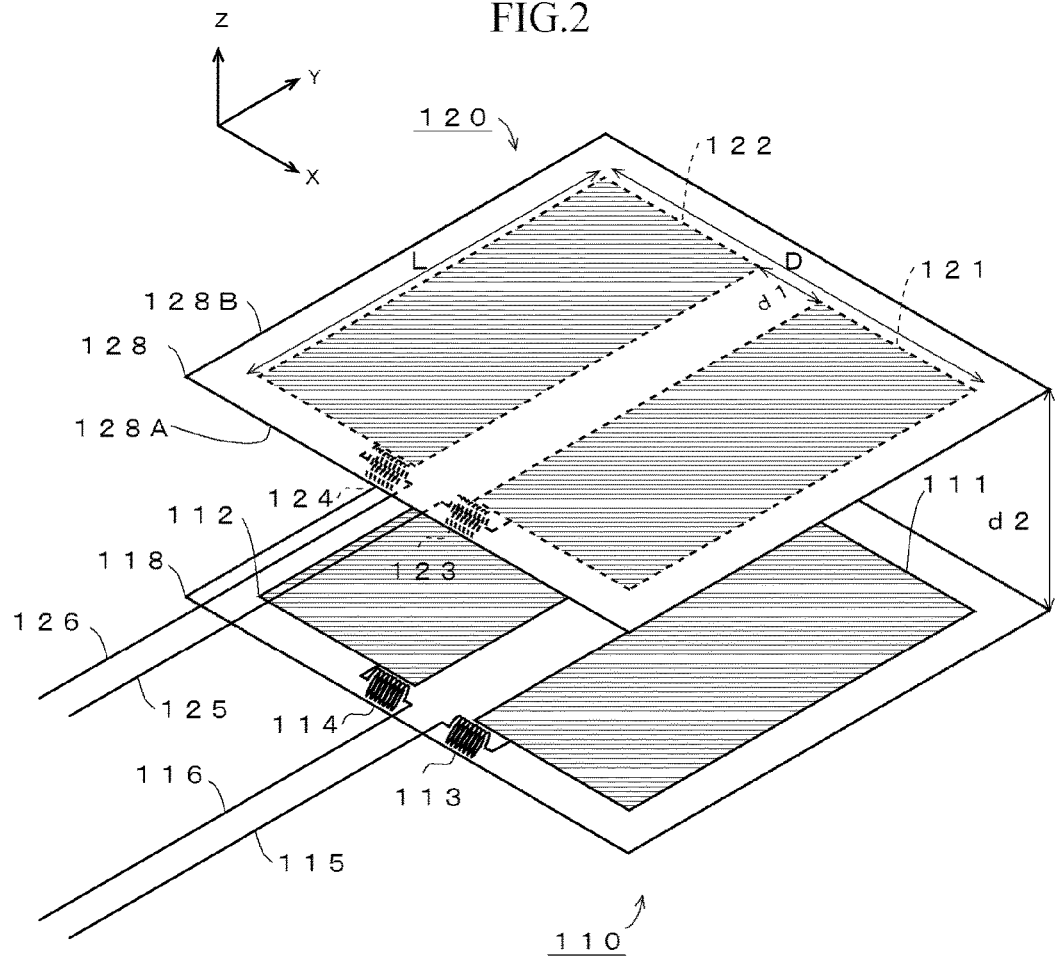
FIG. 2 is a view illustrating a structural example of the wireless power transmission system utilizing series resonance.

FIG. 2 is a view illustrating a state that the power transmission coupler 110 and the power reception coupler 120 are disposed to oppose each other. As illustrated in this view, the power transmission coupler 110 and the power reception coupler 120 are disposed so that the circuit boards 118, 128 are in parallel across a distance d2 and the front surfaces 118A, 128A of the circuit boards 118, 128 oppose each other.

Figure 3:
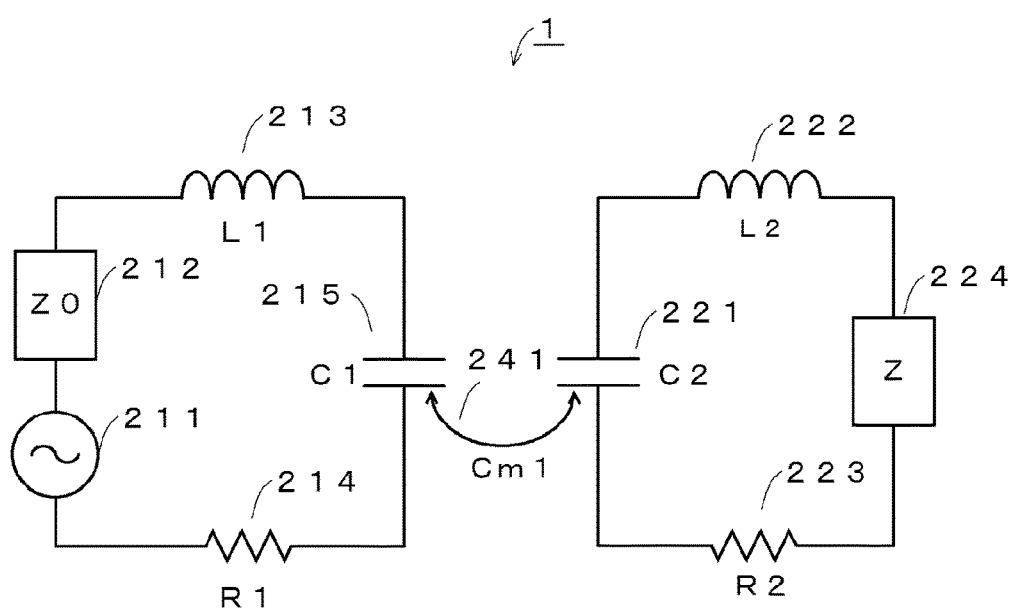
FIG. 3 is an equivalent circuit of the wireless power transmission system illustrated in FIG. 2.

FIG. 3 is a diagram illustrating an equivalent circuit of the wireless power transmission system 1 illustrated in FIG. 2. In FIG. 3, an alternating-current power generating unit 211 generates and outputs alternating-current power with a frequency corresponding to the resonance frequency. A power supply unit load 212 exhibits a value equal to characteristic impedances of the connection lines 115, 116 and the connection lines 125, 126, and has a value of Z0. An inductor 213 corresponds to the inductors 113, 114 and has an element value of L1. A resistor 214 exhibits resistance which accompanies a transmission side circuit, mainly the inductor, and has an element value of R1. A capacitor 215 is a capacitor of an element value C1 occurring between the electrodes 111, 112. A capacitor 221 is a capacitor of an element value C2 occurring between the electrodes 121, 122. An inductor 222 corresponds to the inductors 123, 124 and has an element value of L2. A resistor 223 exhibits resistance which accompanies a reception side circuit, mainly the inductor, and has an element value of R2. A load 224 is supplied with power outputted from the alternating-current power generating unit 211 and transmitted via the power transmission coupler and the power reception coupler. A capacitor 241 denotes a capacitor occurring between the electrodes 111, 112 and the electrodes 121, 122 and has an element value of Cm1. Note that the load 224 is, for example, constituted of a rectifying device, a secondary battery, and so on. Of course, it may be constituted of other elements.

Figure 4:
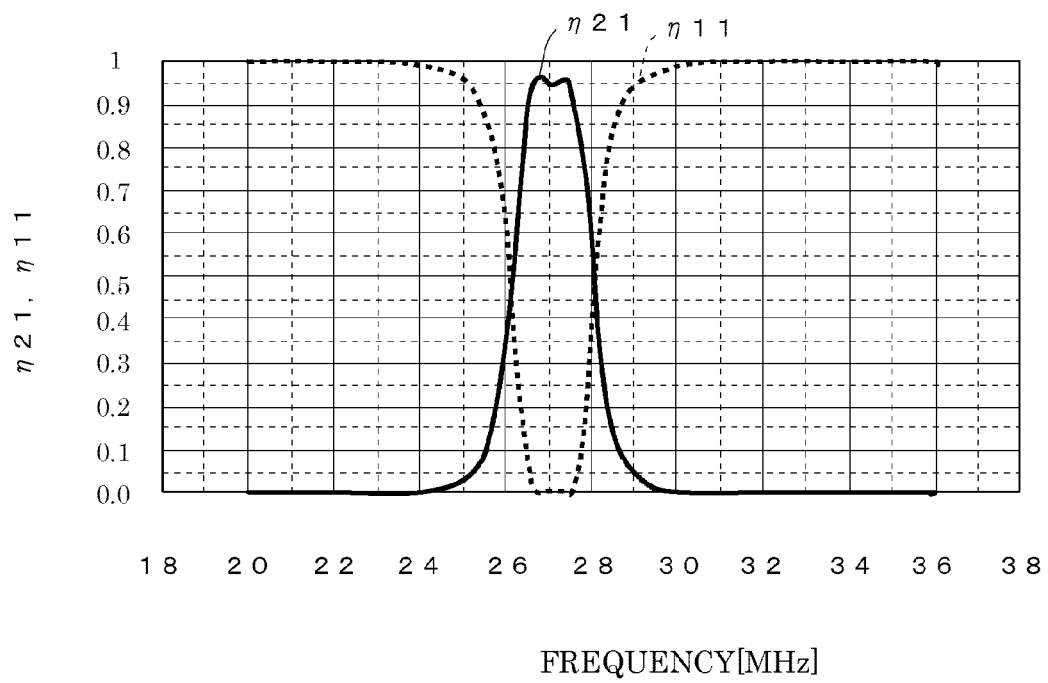
FIG. 4 is a diagram illustrating frequency characteristics of transmission efficiency and reflection loss of the wireless power transmission system illustrated in FIG. 2.

Next, operations of the wireless power transmission system utilizing series resonance illustrated in FIG. 2 will be described. FIG. 4 is a diagram illustrating frequency characteristics of transmission efficiency $\eta 21$ ($=|S21|^2$) from the power transmission coupler 110 to the power reception coupler 120 and reflection loss $\eta 11$ ($=|S11|^2$) in the case where the power transmission coupler 110 and the power reception coupler 120 of the wireless power transmission system illustrated in FIG. 2 are disposed to oppose each other across a distance of 200 mm (the case where d2=200 mm). In this diagram, the horizontal axis denotes frequency (MHz) of transmitted alternating-current power, and the vertical axis denotes transmission efficiency. In the example illustrated in FIG. 4, it can be seen that a transmission efficiency of about 95% is achieved around 27 MHz. Note that in FIG. 2, for example, the inductors 113, 114, 123, 124 are each wound 13 times and has an inductance value of 2.8 µH, sizes (D and L) of the circuit boards 118, 128 are 250×250 mm, and the gap d1 between the electrodes 111, 112 and the electrodes 121, 122 is 34.4 mm.

Figure 5:
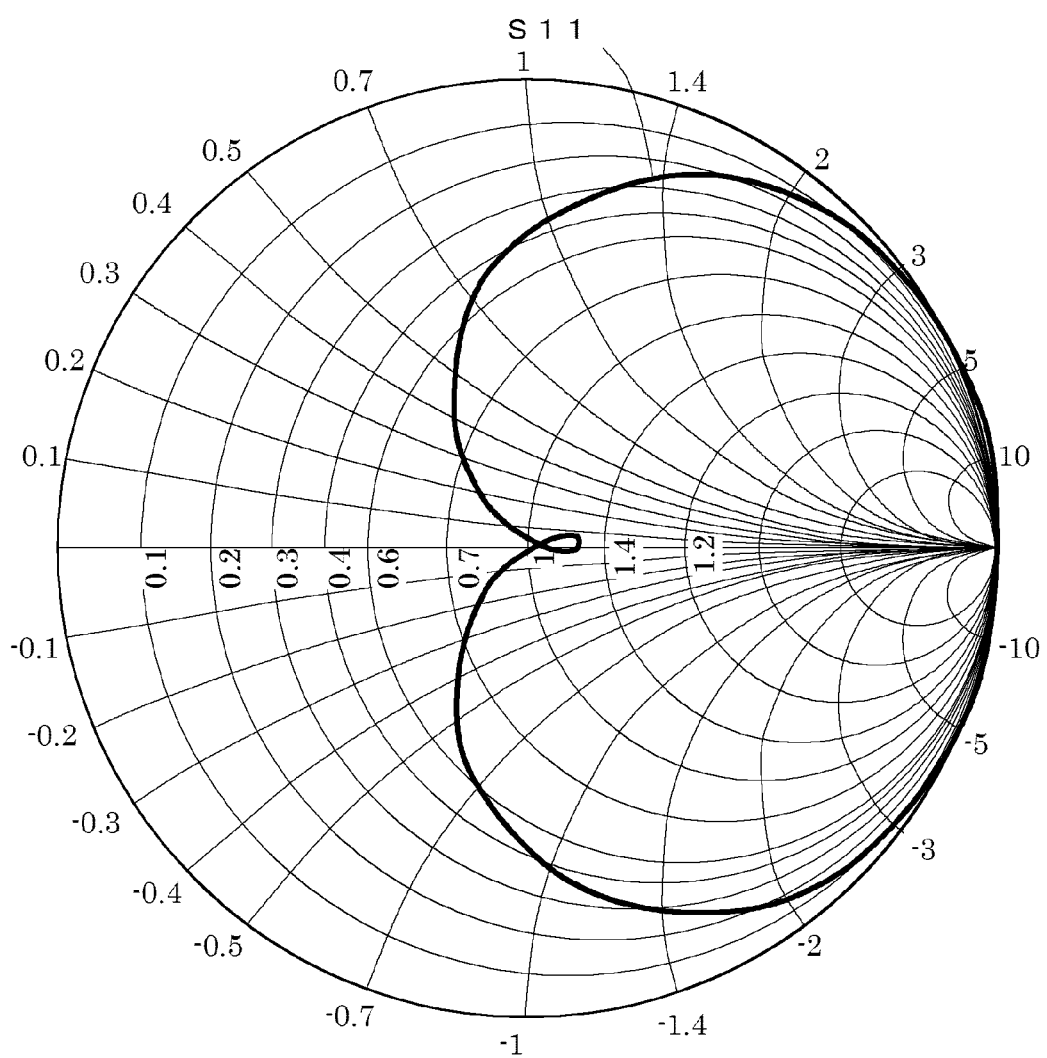
FIG. 5 is a diagram illustrating a smith chart of impedance of a power transmission coupler illustrated in FIG. 2.

FIG. 5 illustrates a smith chart of impedance S11 of the power transmission coupler 110 of the wireless power transmission system utilizing series resonance illustrated in FIG. 2. In this case, a port impedance of the measuring apparatus is set to a value equal to a characteristic impedance Z0 (real value) of a connection line. As illustrated in these diagrams, in the wireless power transmission system illustrated in FIG. 2, a trajectory of impedance of the power transmission coupler 110 and the power reception coupler 120 passes near the center of circle of the smith chart, and thus power can be transmitted efficiently while suppressing reflections by setting to perform transmission near the center.

Figure 6:
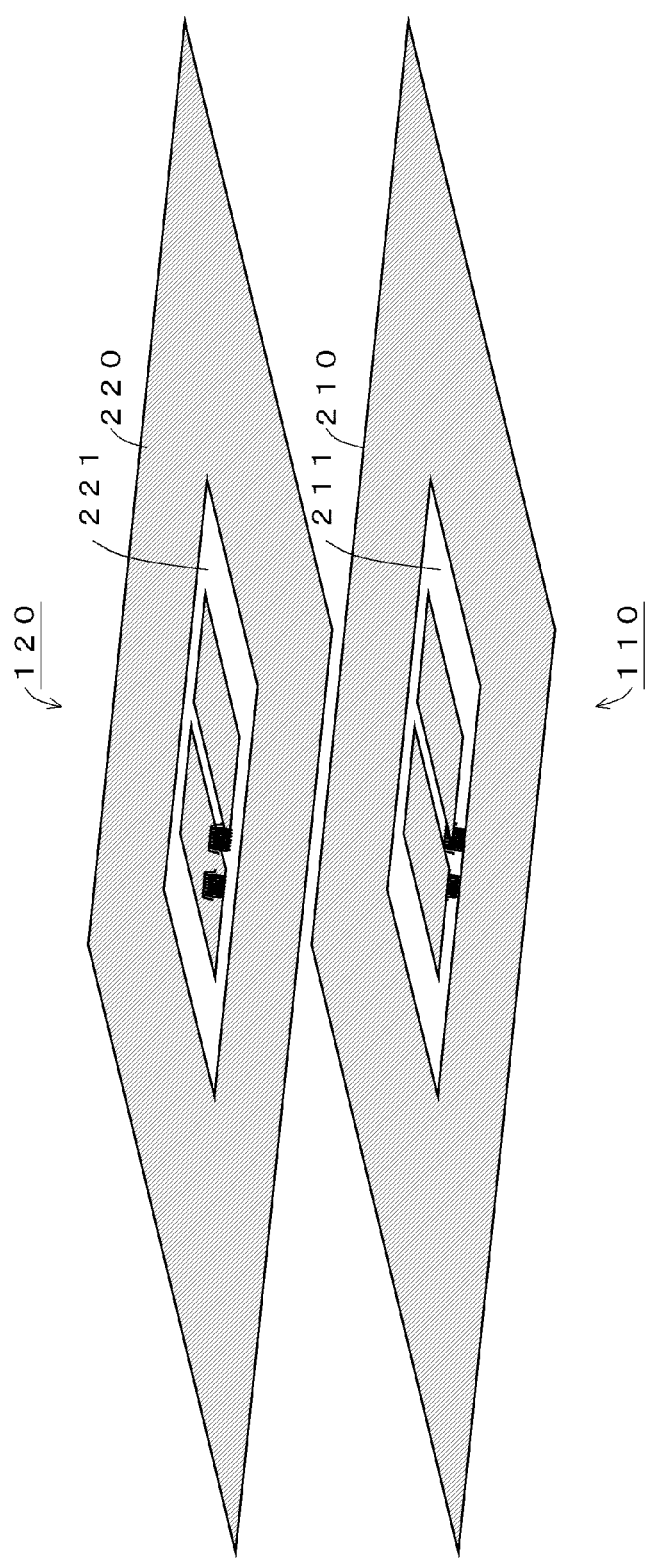
FIG. 6 is a view illustrating a state of the case where power transmission/reception couplers illustrated in FIG. 2 are disposed in window parts of ground plates.
Figure 7:
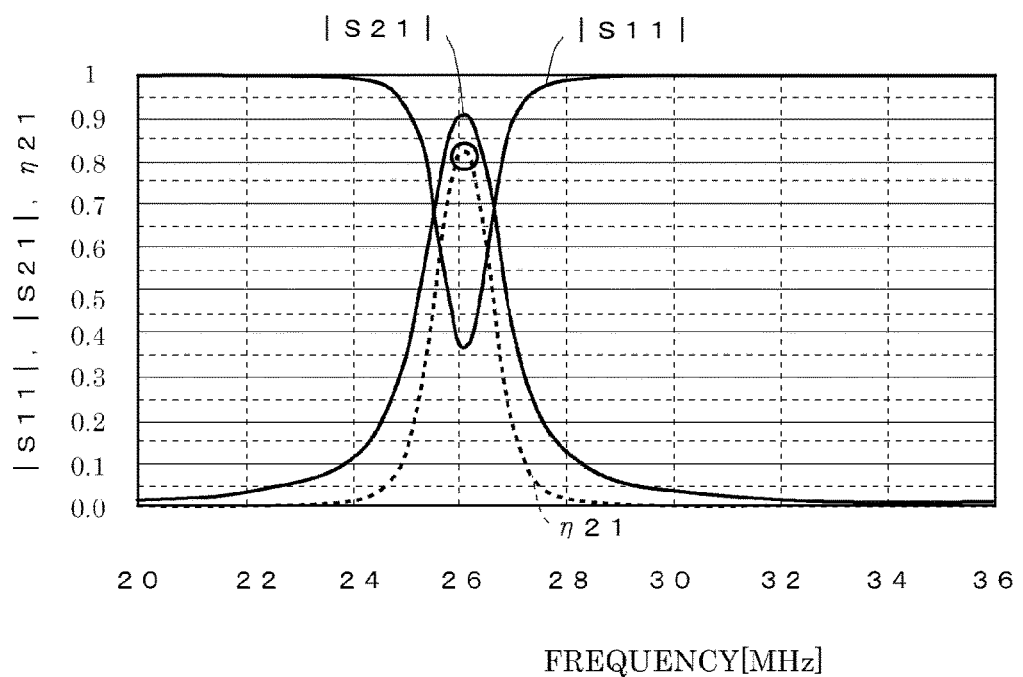
FIG. 7 is a diagram illustrating frequency characteristics of transmission efficiency and reflection loss in the case illustrated in FIG. 6.
Figure 8:
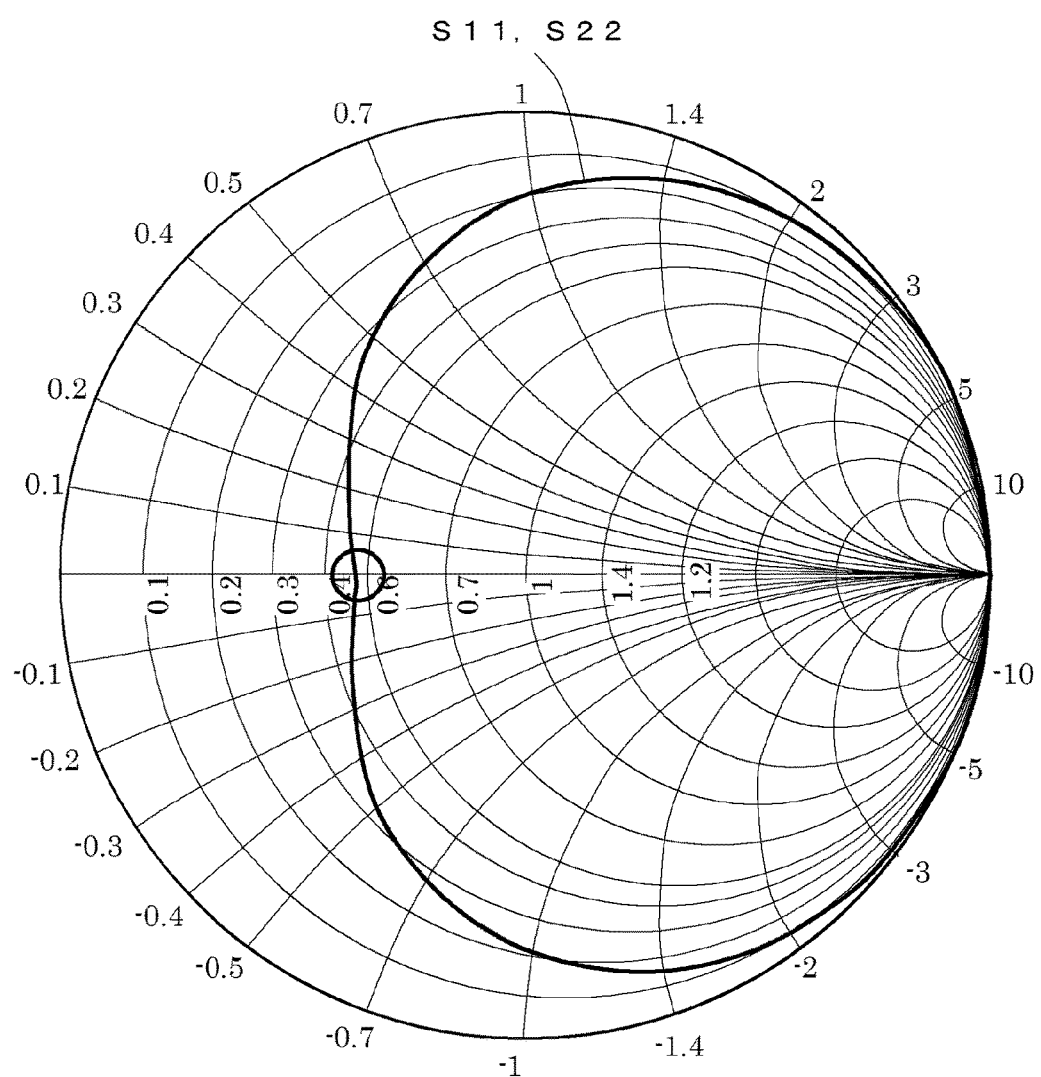
FIG. 8 is a diagram illustrating a smith chart of impedance of the power transmission coupler illustrated in FIG. 6.

Incidentally, the power transmission coupler 110 and the power reception coupler 120 of the wireless power transmission system illustrated in FIG. 2 may be disposed in close vicinity to ground. In such a case, it may be affected by the ground. This will be described. FIG. 6 illustrates a state that the power transmission coupler 110 of the wireless power transmission system illustrated in FIG. 2 is disposed inside a window part 211 of a ground plate 210 having the window part 211, and the power reception coupler 120 is disposed inside a window part 221 of a ground plate 220 having the window part 221. Note that sizes of the ground plates 210, 220 are 1000 mm×1000 mm, and sizes of the window parts 211, 221 are 450 mm×350 mm. FIG. 7 is a diagram illustrating frequency characteristics of transmission efficiency $\eta 21$ from the power transmission coupler 110 to the power reception coupler 120 and absolute values of impedances S11, S21 in the case where the power transmission coupler 110 and the power reception coupler 120 of the wireless power transmission system illustrated in FIG. 6 are disposed to oppose each other across a distance of 200 mm. FIG. 8 illustrates a smith chart of impedance S11 of the power transmission coupler 110 of the wireless power transmission system illustrated in FIG. 6. As illustrated in FIG. 7 and FIG. 8, the resonance frequency decreases from 27 MHz in the case of FIG. 2 to 26.1 MHz, the impedance decreases from 50Ω to 26Ω, and the transmission efficiency also decreases from 95% to 81%.

Figure 9:
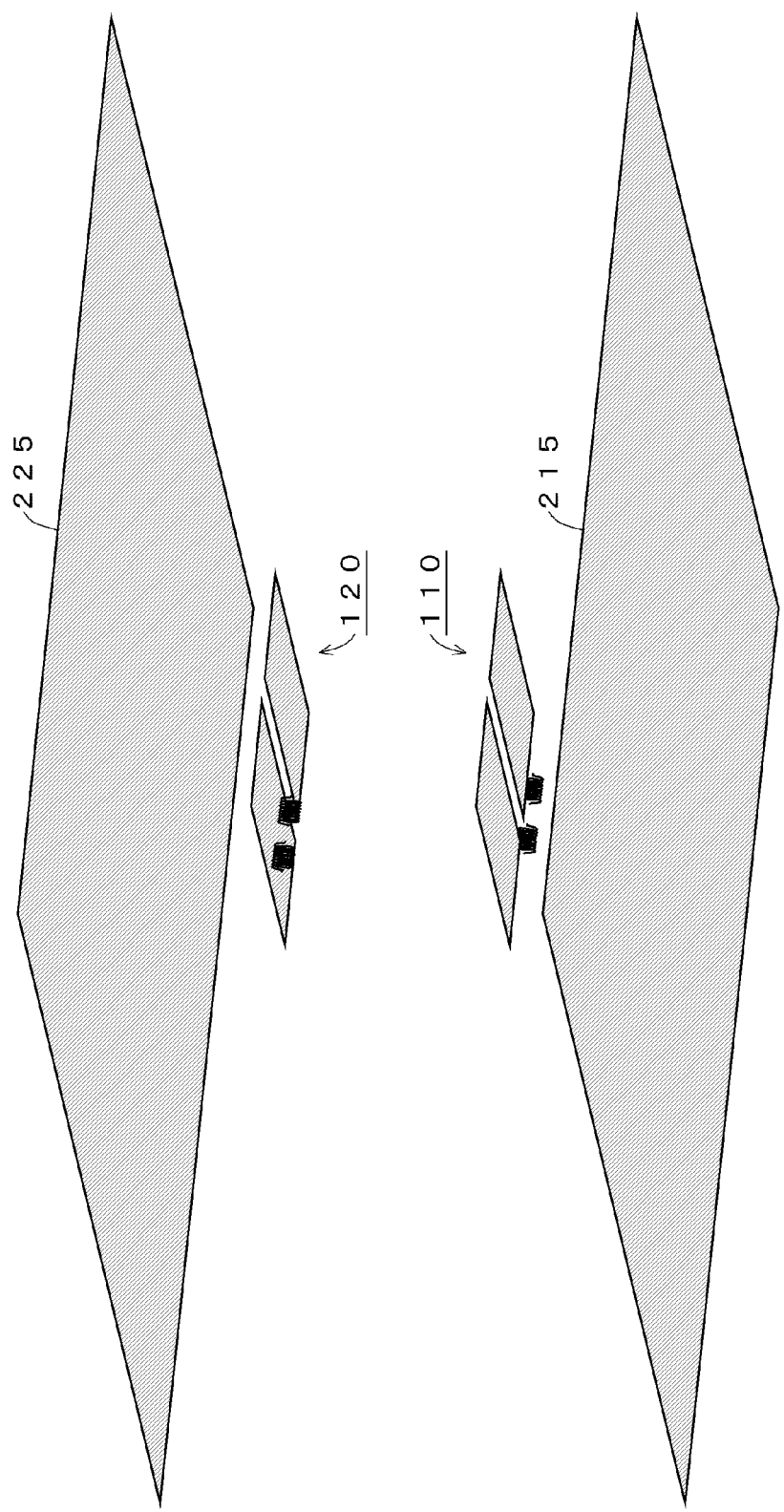
FIG. 9 is a view illustrating a state that ground plates are disposed in the vicinities of the power transmission/reception couplers illustrated in FIG. 2.
Figure 10:
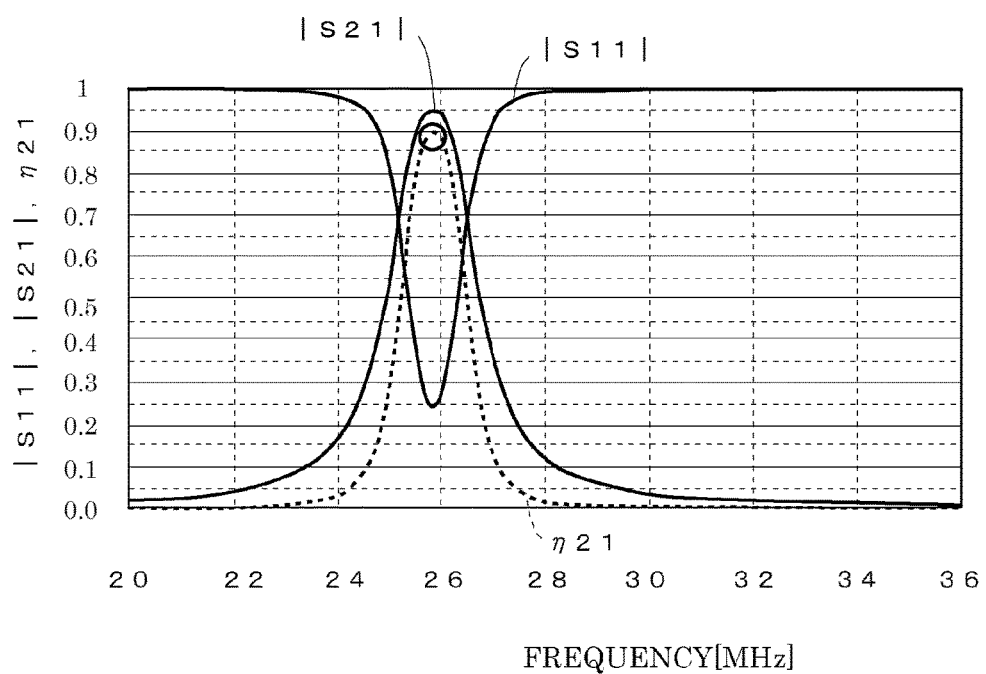
FIG. 10 is a diagram illustrating frequency characteristics of transmission efficiency and reflection loss in the case illustrated in FIG. 9.
Figure 11:
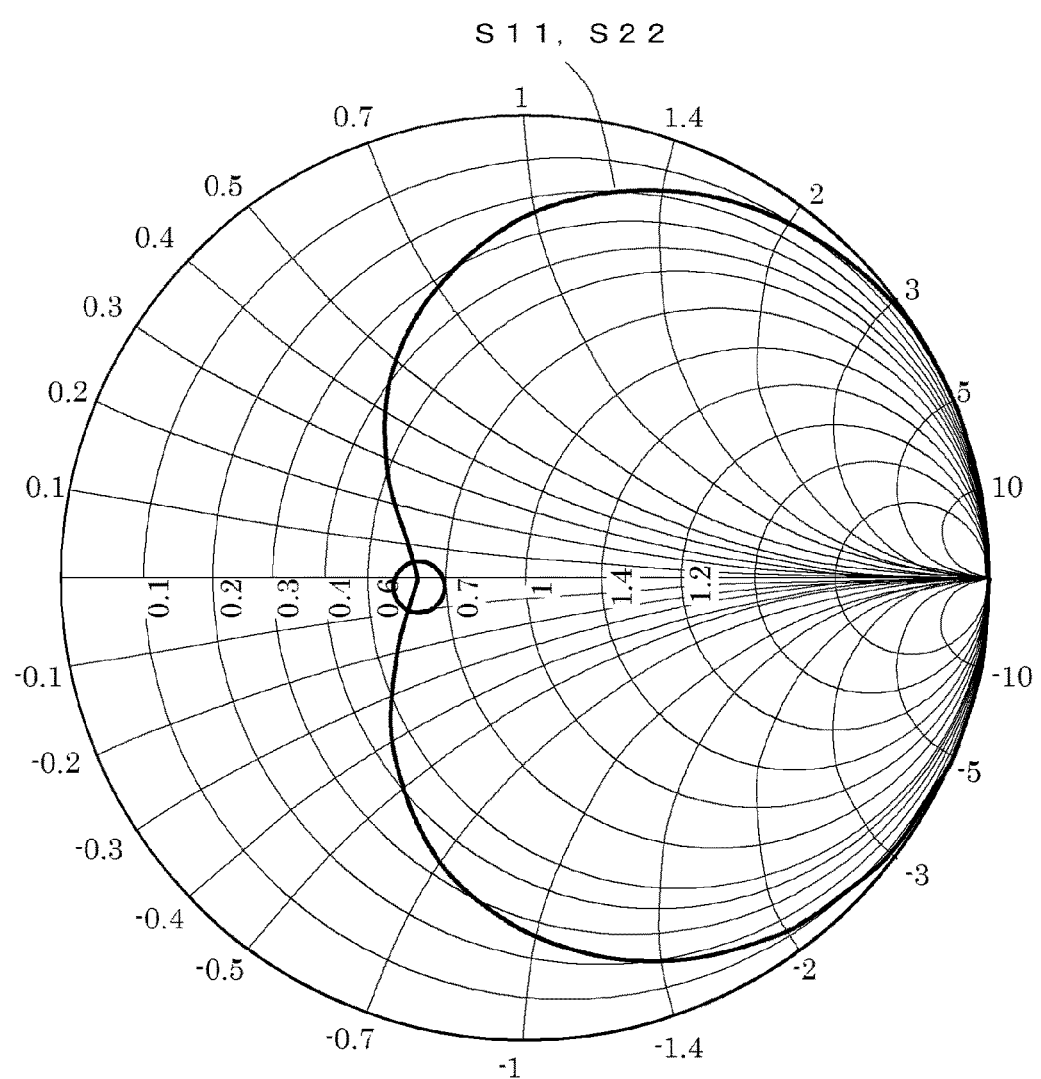
FIG. 11 is a diagram illustrating a smith chart of impedance of the power transmission coupler illustrated in FIG. 9.

FIG. 9 illustrates a state that the power transmission coupler 110 of the wireless power transmission system illustrated in FIG. 2 is disposed in close vicinity to a ground plate 215, and the power reception coupler 120 is disposed in close vicinity to a ground plate 225. Note that sizes of the ground plates 215, 225 are 1000 mm×1000 mm. FIG. 10 is a diagram illustrating frequency characteristics of transmission efficiency $\eta 21$ from the power transmission coupler 110 to the power reception coupler 120 and absolute values of impedances S11, S21 in the case where the power transmission coupler 110 and the power reception coupler 120 of the wireless power transmission system illustrated in FIG. 9 are disposed to oppose each other across a distance of 200 mm and disposed across a distance of 100 mm from the ground plates 215, 225. FIG. 11 illustrates a smith chart of impedance S11 of the power transmission coupler 110 of the wireless power transmission system illustrated in FIG. 9. As illustrated in FIG. 10 and FIG. 11, the resonance frequency decreases from 27 MHz in the case of FIG. 2 to 25.9 MHz, the impedance decreases from 50Ω to 31Ω, and the transmission efficiency also decreases from 95% to 89%.

Thus, when the coupler is disposed in close vicinity to the ground plate, resonance frequencies and impedance characteristics change by being affected by the ground plate, and also the transmission efficiency decreases.

(B) Description of a First Embodiment of the Present Invention

Figure 12:
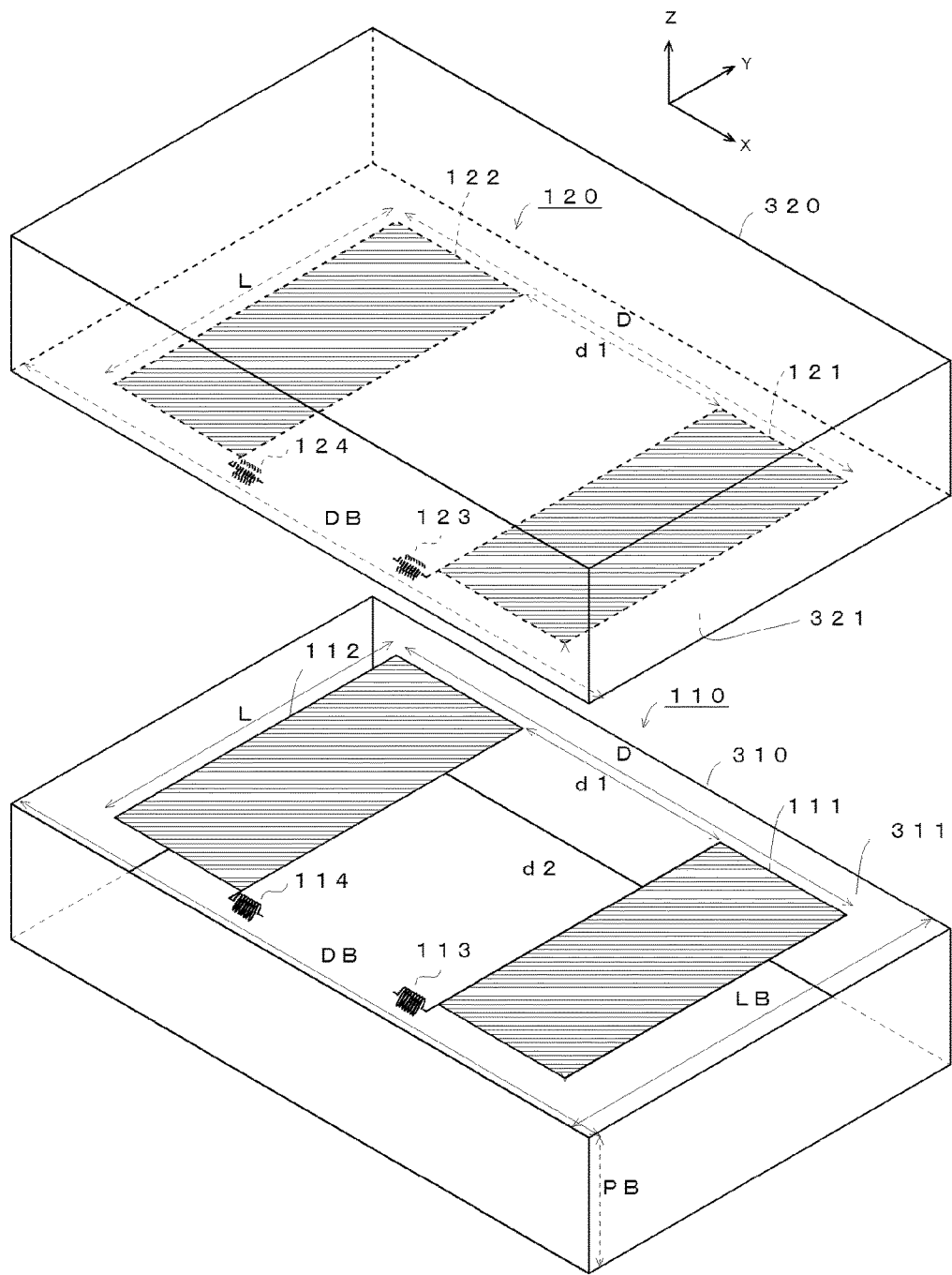
FIG. 12 is a view illustrating a structural example of a first embodiment of the present invention.

Next, with reference to FIG. 12 to FIG. 17, a basic structure of the wireless power transmission system according to a first embodiment of the present invention will be described. FIG. 12 is a view illustrating a structural example of the first embodiment. As illustrated in this view, in the first embodiment, the power transmission coupler 110 is housed in a casing 310, and the power reception coupler 120 is housed in a casing 320. The casings 310, 320 are constituted of a member with good conductivity such as aluminum or copper, and have a regular hexahedron structure in which a plane where electrodes are disposed is open. In the casings 310, 320, the length in a direction in parallel to an electric field generated by the electrodes is DB, the length in a direction orthogonal to the electric field is LB, and the depth from openings 311, 321 to a bottom surface is PB.

Figure 13:
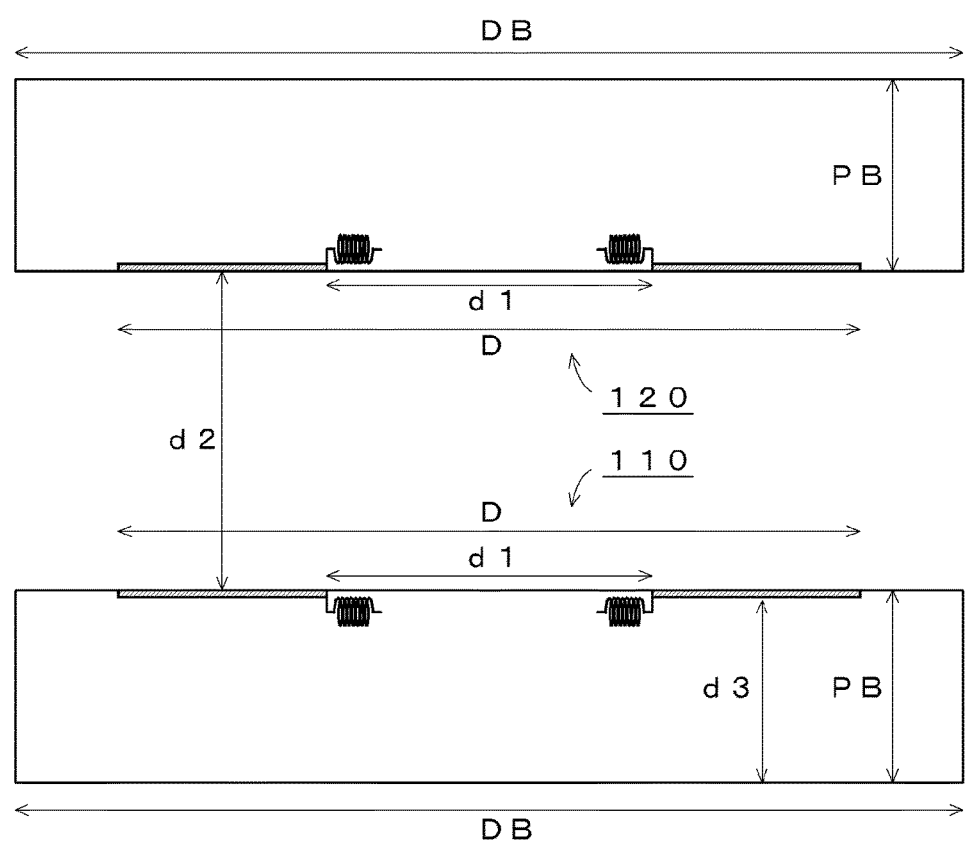
FIG. 13 is a view illustrating a cross section of the first embodiment illustrated in FIG. 12.

FIG. 13 is a view seeing the first embodiment illustrated in FIG. 12 from a direction of Y axis illustrated in FIG. 12. As illustrated in FIG. 13, electrodes are disposed at a substantially center of the openings 311, 321 of the casings. Further, the distance from the electrodes to the bottom surface is d3.

Figure 14:
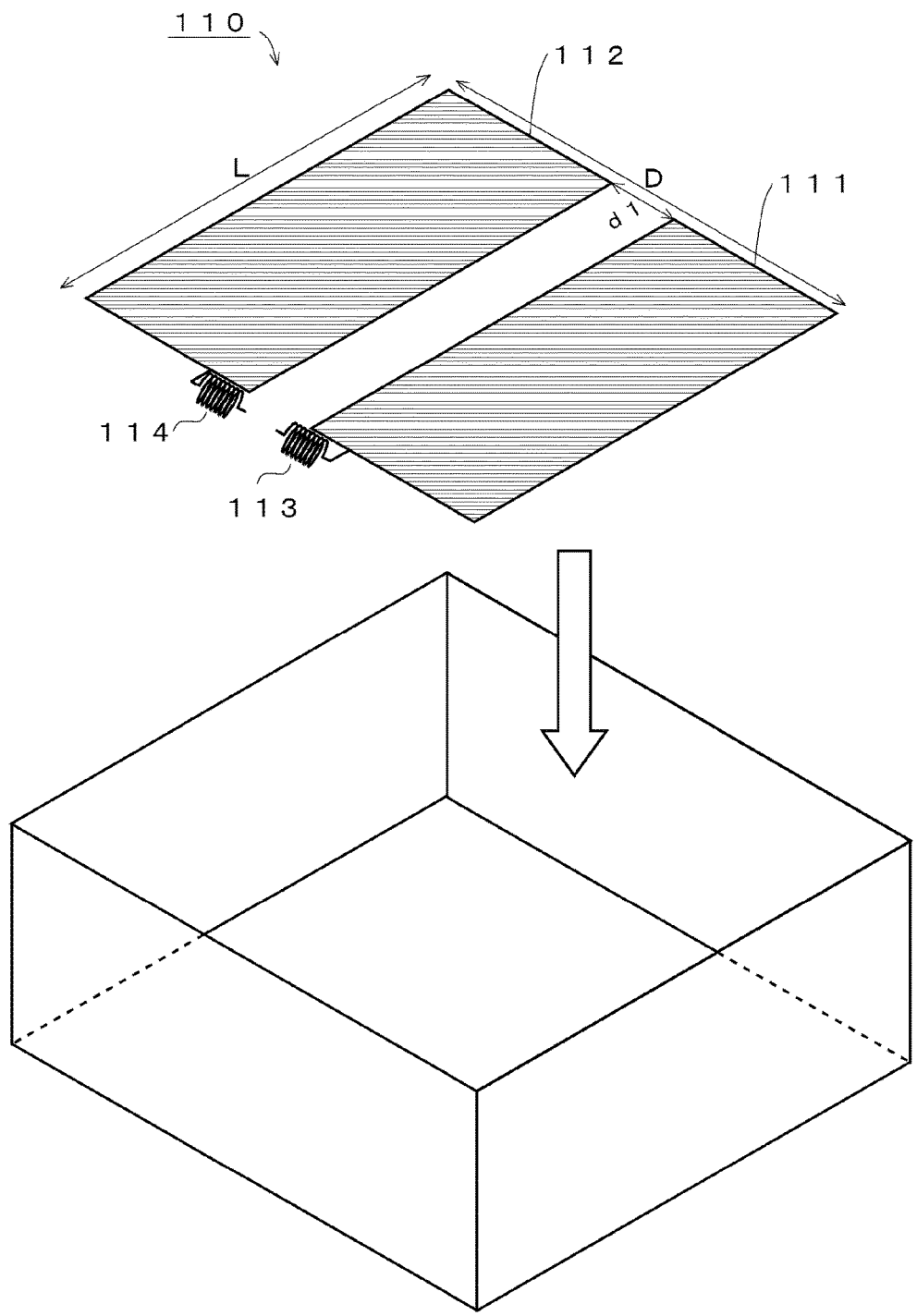
FIG. 14 is a view illustrating a state that a power transmission coupler illustrated in FIG. 1 is housed in a casing.
Figure 15:
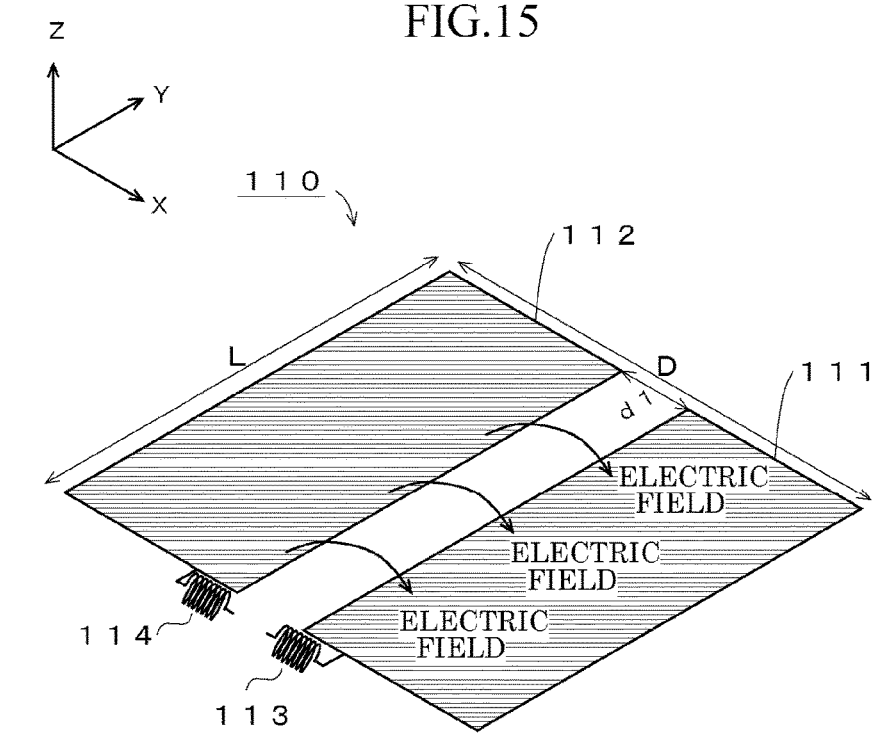
FIG. 15 is a view illustrating a modification example for not allowing a change in characteristic when housed in the casing.
Figure 15:
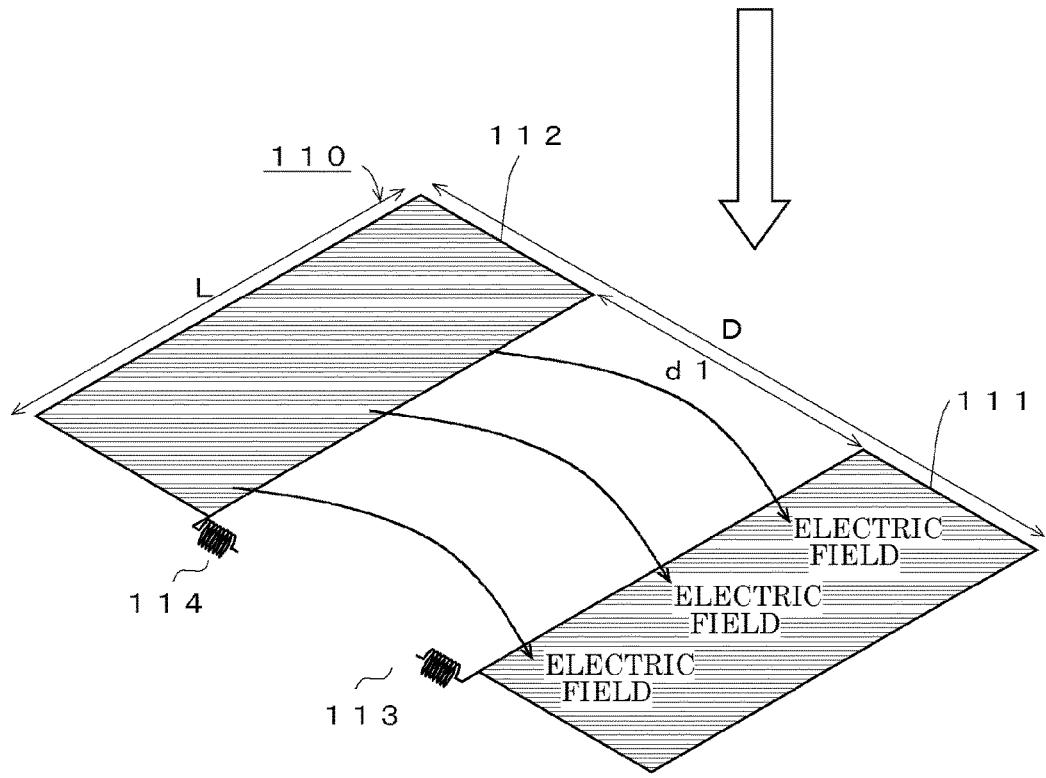

Note that when the electrodes illustrated in FIG. 1 are merely housed in a casing as illustrated in FIG. 14, resonance frequencies change due to the influence of the casings. Accordingly, in this embodiment, as illustrated in FIG. 15, the two electrodes are separated in a direction in parallel to the electric field (increase by d1) to increase the spread of electric field in an opposing direction (X direction), thereby increasing the coupling coefficient between the couplers to compensate the impedance.

Thus, by housing the power transmission coupler 110 and the power reception coupler 120 in the casings 310, 320, the spread of electric field in a rear surface direction and a lateral direction of the couplers is suppressed, and the electric field coupling to the ground (ground plate) is decreased. Thus, the change of the frequencies can be suppressed.

Note that settings to satisfy the following expressions (1) to (3) are made among DB, D, LB, L d2, PB, d3 illustrated in FIG. 12 and FIG. 13.

$$DB \geq 1.2 \times D \quad (1)$$

$$LB \geq 1.3 \times L \quad (2)$$

$$PB \geq d3 \geq d2/2 \quad (3)$$

Here, when DB is close to D or LB is close to L, casing side surfaces are close to the coupler electrodes. Thus, the electric field coupling of the electrodes of the couplers and the casing side surfaces intensifies and the electric field coupling between the transmission/reception couplers weakens. In this case, a decrease in input impedance of the couplers and a reduction in transmission distance occur. Thus, DB and LB need to be equal to or more than a predetermined value relative to D and L, respectively. When the transmission/reception distance is 20 cm assuming EV (Electric Vehicle) and other power transmission, impedance matching is achieved if DB and LB of about 1.2 times and 1.3 times D and L, respectively, can be secured, enabling good power transmission. Further, regarding PB, on the principle of mirror image, if a value of half the opposing distance d2 of the power transmission/reception couplers can be secured, impedance matching is achieved and good power transmission is enabled.

Figure 16:
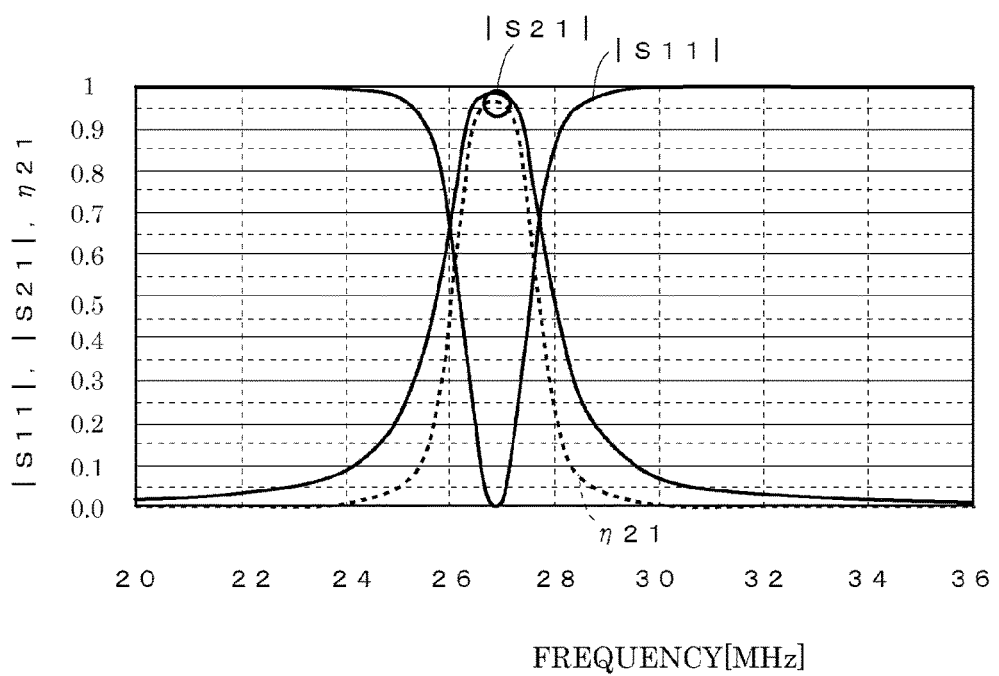
FIG. 16 is a diagram illustrating frequency characteristics of transmission efficiency and reflection loss of the first embodiment illustrated in FIG. 12.
Figure 17:
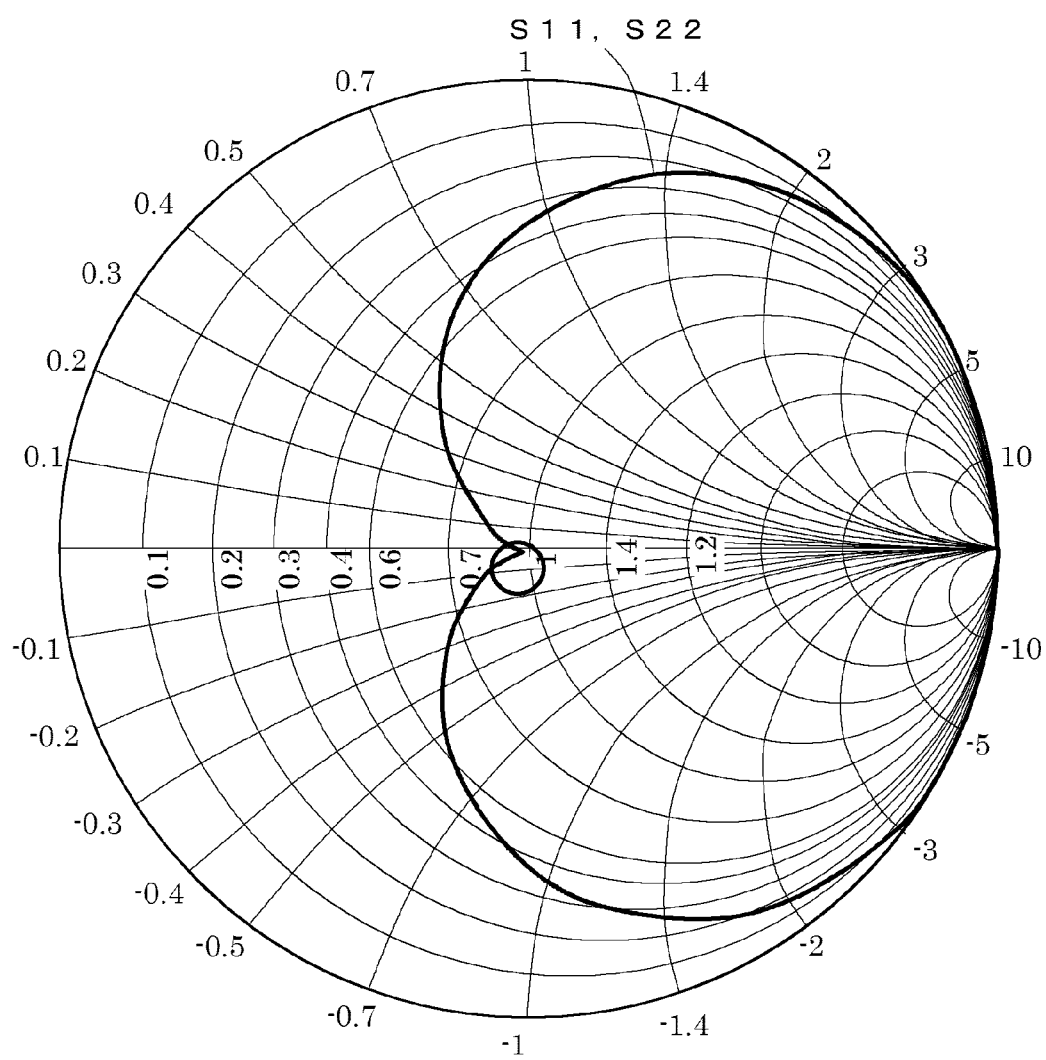
FIG. 17 is a diagram illustrating a smith chart of impedance of a power transmission coupler of the first embodiment illustrated in FIG. 12.

FIG. 16 is a diagram illustrating frequency characteristics of transmission efficiency η21 from the power transmission coupler 110 to the power reception coupler 120 of the wireless power transmission system illustrated in FIG. 12 and FIG. 13 and absolute values of impedances S11, S21. Note that in FIG. 16, d1=158 mm, d2=200 mm, d3=100 mm, D=350 mm, L=250 mm, DB=450 mm, LB=350 mm, and PB≈100 mm are set. FIG. 17 illustrates a smith chart of impedance S11 of the power transmission coupler 110 of the wireless power transmission system. As illustrated in FIG. 16 and FIG. 17, the resonance frequency is 26.9 MHz similarly to the case of FIG. 2, the impedance is 50Ω, and the transmission efficiency is 96%.

Figure 18:
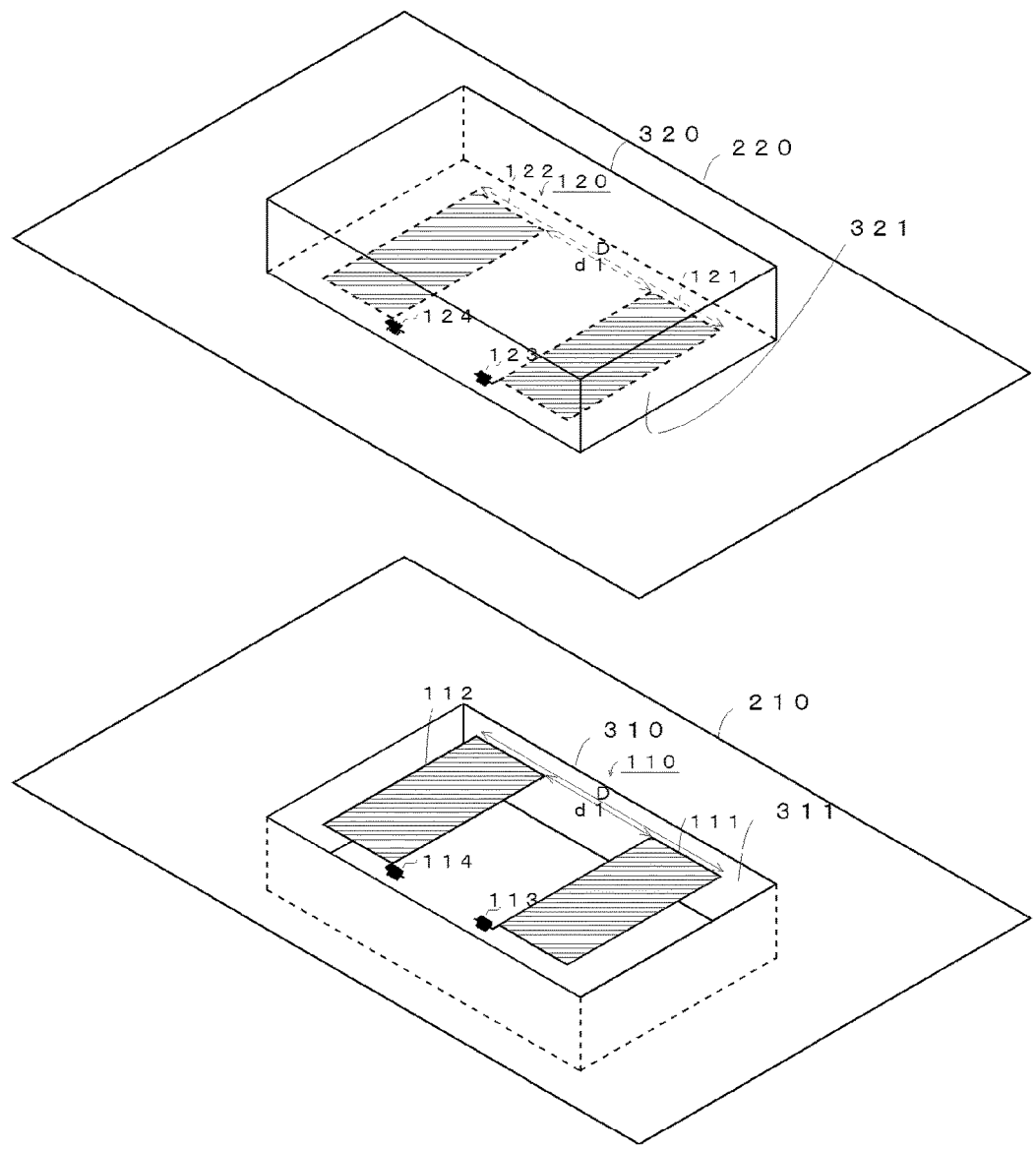
FIG. 18 is a view illustrating a state that ground plates are disposed in the first embodiment illustrated in FIG. 12.
Figure 19:
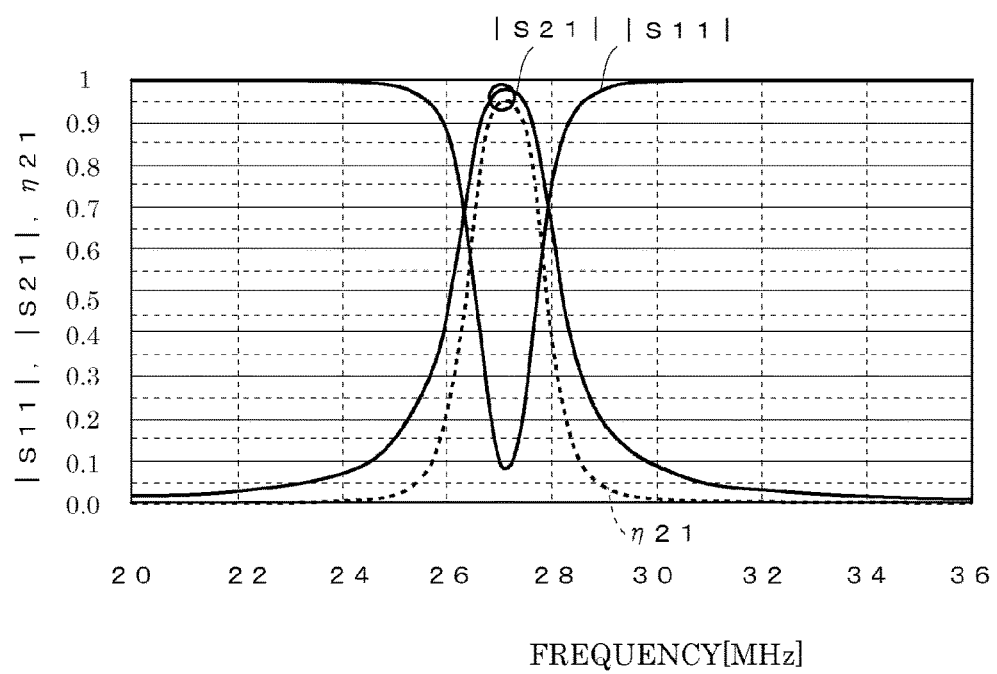
FIG. 19 is a diagram illustrating frequency characteristics of transmission efficiency and reflection loss in the case illustrated in FIG. 18.
Figure 20:
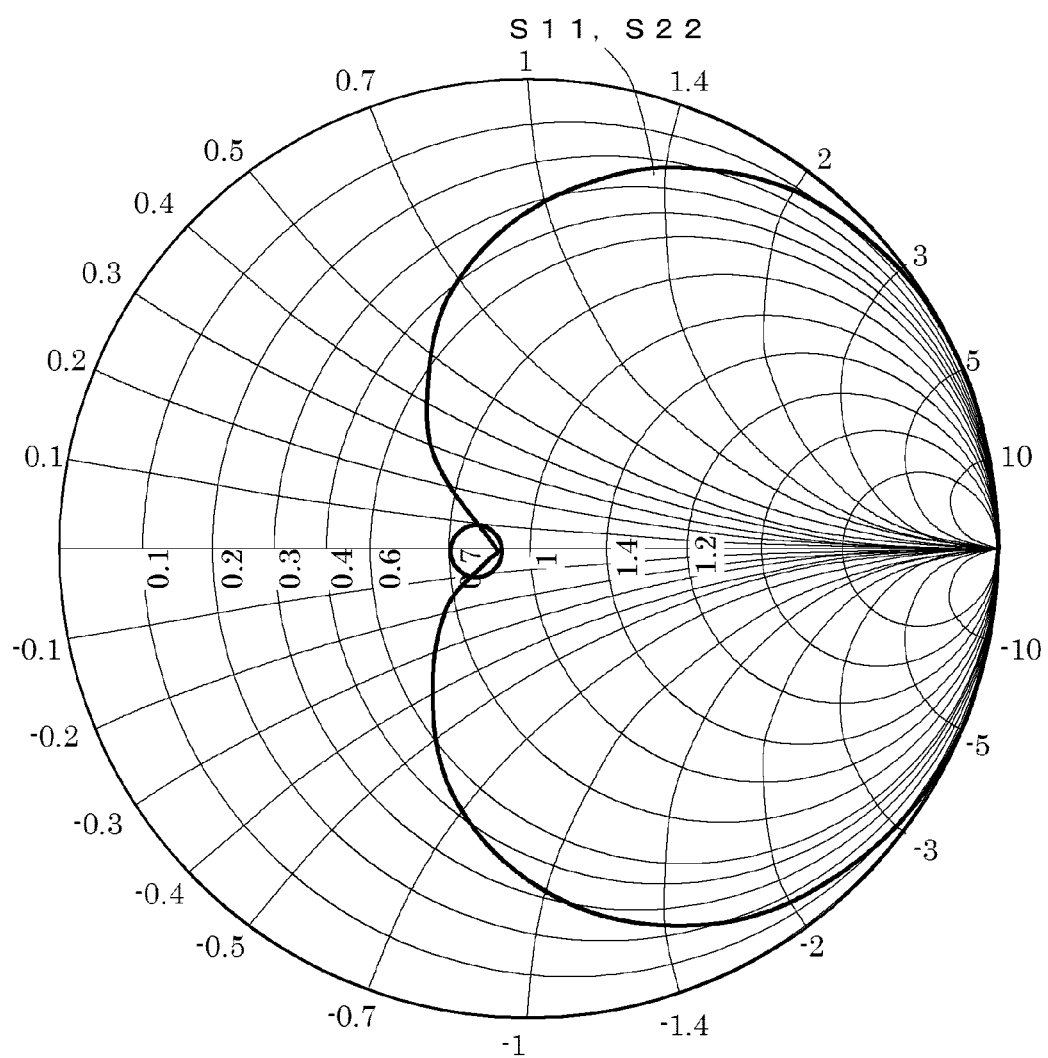
FIG. 20 is a diagram illustrating a smith chart of impedance of a power transmission coupler illustrated in FIG. 18.

FIG. 18 illustrates a state that the ground plates 210, 220 are disposed in the vicinities of the openings 311, 321 of the casings 310, 320 similarly to FIG. 6, with respect to the first embodiment illustrated in FIG. 12. Note that sizes of the ground plates 210, 220 are 1000 mm×1000 mm. FIG. 19 is a diagram illustrating frequency characteristics of transmission efficiency η21 from the power transmission coupler 110 to the power reception coupler 120 and absolute values of impedances S11, S21 in the state illustrated in FIG. 18. FIG. 20 illustrates a smith chart of impedance S11 of the power transmission coupler 110 in the state illustrated in FIG. 18. As illustrated in FIG. 19 and FIG. 20, even when ground plates 315, 325 are disposed, the resonance frequency is 27 MHz similarly to the case of FIG. 12, the impedance is 50Ω, and the transmission efficiency is 96%, which are not affected by the ground plates 210, 220.

Figure 21:
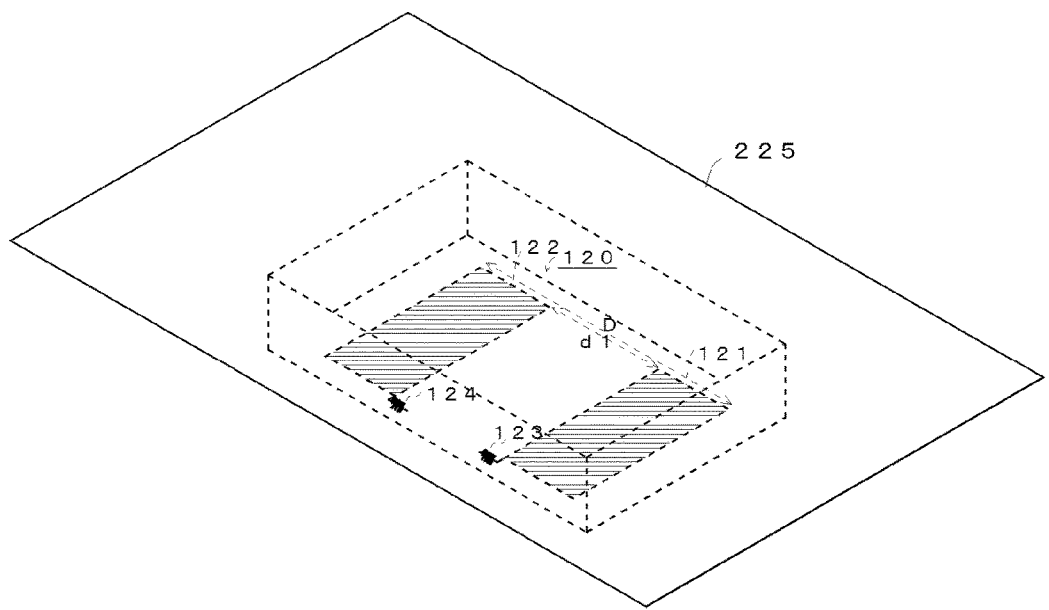
FIG. 21 is a view illustrating a state that ground plates are disposed in the first embodiment illustrated in FIG. 12.
Figure 21:
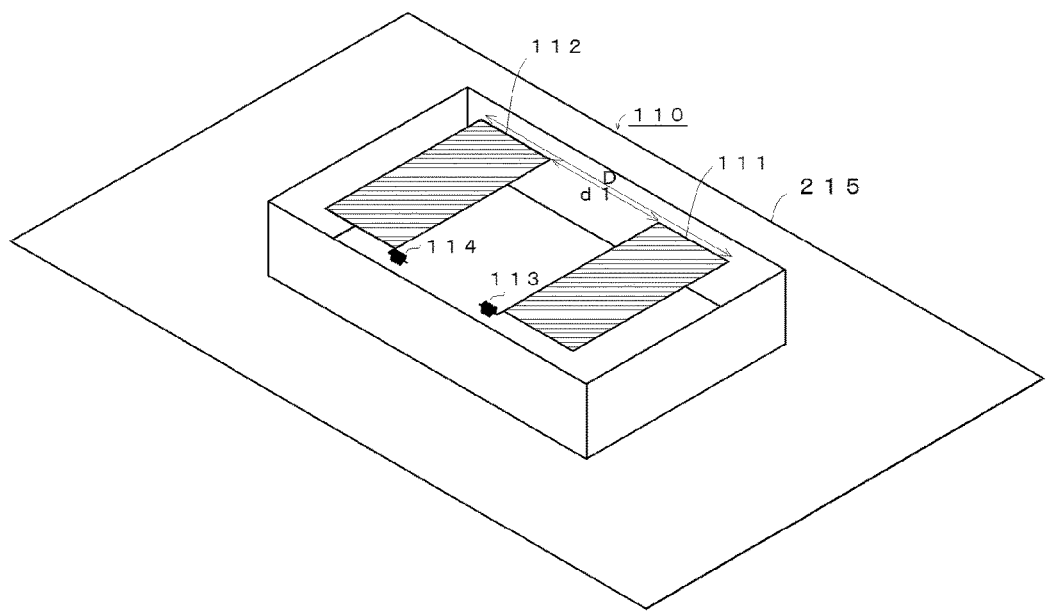
Figure 22:
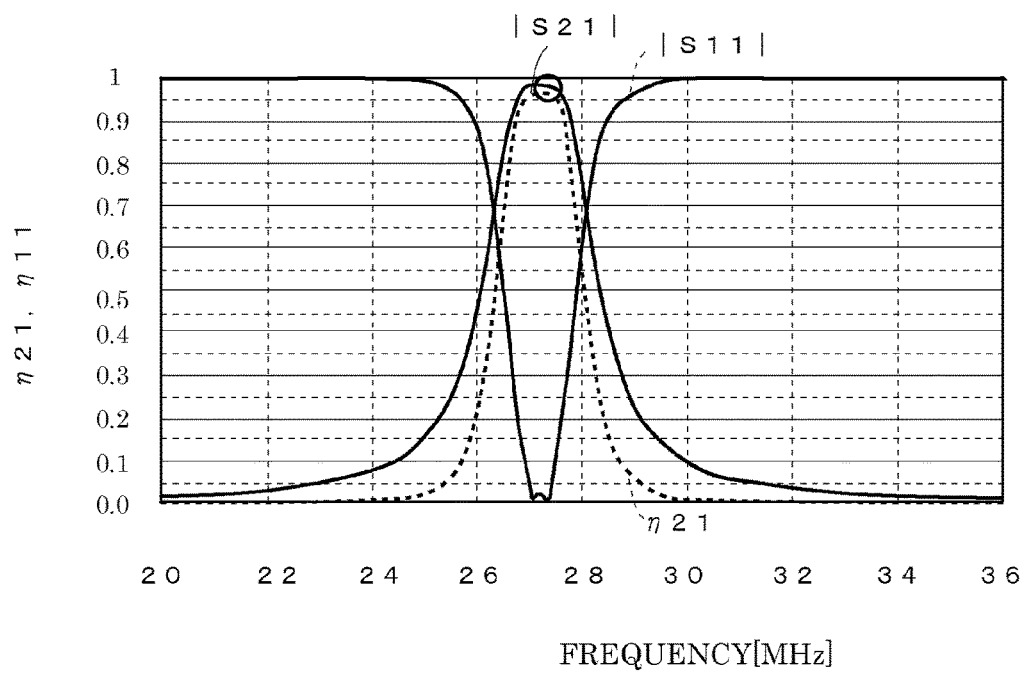
FIG. 22 is a diagram illustrating frequency characteristics of transmission efficiency and reflection loss in the case illustrated in FIG. 21.
Figure 23:
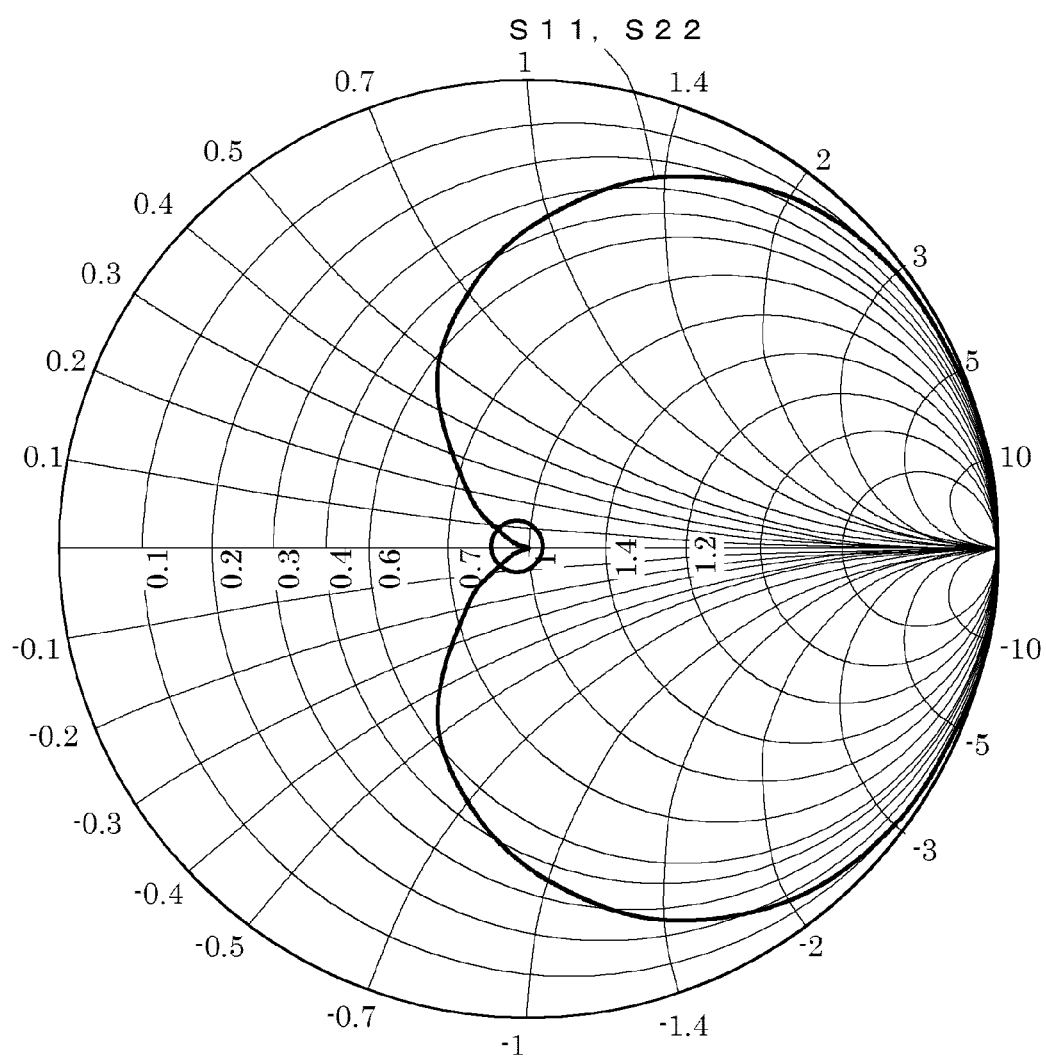
FIG. 23 is a diagram illustrating a smith chart of impedance of a power transmission coupler illustrated in FIG. 21.

FIG. 21 illustrates a state that the ground plates 215, 225 are disposed at the same positions as the bottom surfaces of the casings 310, 320 similarly to FIG. 9, with respect to the first embodiment illustrated in FIG. 12. Note that sizes of the ground plates 215, 225 are 1000 mm×1000 mm. FIG. 22 is a diagram illustrating frequency characteristics of transmission efficiency η21 from the power transmission coupler 110 to the power reception coupler 120 and absolute values of impedances S11, S21 in the state illustrated in FIG. 21. FIG. 23 illustrates a smith chart of impedance S11 of the power transmission coupler 110 in the state illustrated in FIG. 21. As illustrated in FIG. 22 and FIG. 23, even when the ground plates 215, 225 are disposed, the resonance frequency is 27.1 MHz similarly to the case of FIG. 12, the impedance is 50Ω, and the transmission efficiency is 96%, which are not affected by the ground plates 215, 225.

As described above, according to the first embodiment of the present invention, by housing the power transmission coupler 110 and the power reception coupler 120 in the casings 310, 320 and suppressing the spread of electric field in the rear surface direction and the lateral direction by the casings 310, 320, the coupling capacitance to the ground plates is decreased, and the influence by the ground plates can be reduced. Thus, it becomes possible to obtain stable characteristics.

(C) Description of a Second Embodiment of the Present Invention

Figure 24:
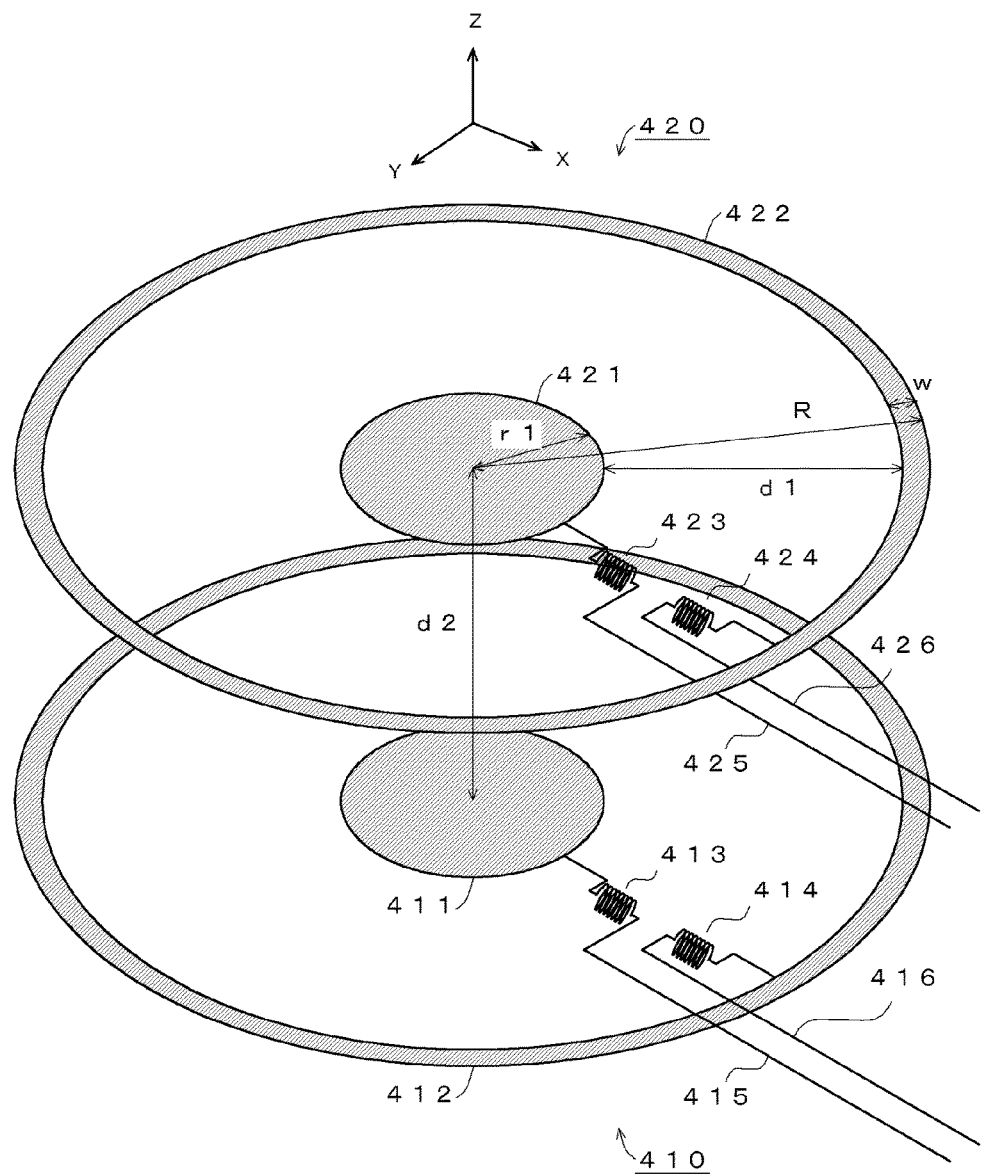
FIG. 24 is a view for explaining the principles of a second embodiment of the present invention.

Next, with reference to FIG. 24 to FIG. 37, a basic structure of the wireless power transmission system according to a second embodiment of the present invention will be described. First, basic principles of the second embodiment will be described. FIG. 24 is a view for explaining the principles of the second embodiment. In the example illustrated in this view, a power transmission coupler 410 is constituted of a circular center electrode 411, a ring-shaped annular electrode 412, inductors 413, 414, and connection lines 415, 416, and a power reception coupler 420 is constituted of a circular center electrode 421, a ring-shaped annular electrode 422, inductors 423, 424, and connection lines 425, 426. In the example of FIG. 24, sizes of the respective elements constituting the power transmission coupler 410 and the power reception coupler 420 are the same. Of course, even when the sizes of the respective elements are different, power can be transmitted by making an adjustment so that the resonance frequency is the same. Note that although only the electrodes are illustrated in the example of FIG. 24, the electrodes can be formed on a substrate or base material formed of a glass epoxy substrate, a glass composite substrate, or the like, similarly to FIG. 1 and FIG. 2.

Here, the center electrode 411 is constituted of a platy conductive member (for example, a member of copper, aluminum, or the like) having a circular shape with a radius r1. The annular electrode 412 is constituted of a platy conductive member having an annular shape with an outer radius R and a width w. Note that the center electrode 411 and the annular electrode 412 are disposed on a same plane, and the distance between an outer periphery of the center electrode 411 and an inner periphery of the annular electrode 412 is d1. One end of the inductor 413 is connected to the center electrode 411, and the other end is connected to one end of the connection line 415. One end of the inductor 414 is connected to the annular electrode 412, and the other end is connected to one end of the connection line 416. The connection lines 415, 416 are, for example, constituted of a coaxial cable or a balanced cable. Other ends of the connection lines 415, 416 are connected respectively to output terminals of a not-illustrated alternating-current power generating unit. By connecting the alternating-current power generating unit to the power transmission coupler 410 by the connection lines 415, 416, a power transmission device is constituted. Note that a resonance frequency of a series resonance circuit due to capacitance C of a capacitor formed by the center electrode 411 and the annular electrode 412 and inductance L of the inductors 413, 414 is $f_c$.

On the other hand, the center electrode 421 constituting the power reception coupler 420 is constituted of a platy conductive member having a circular shape with a radius r1. The annular electrode 422 is constituted of a platy conductive member having an annular shape with an outer radius R and a width w. The center electrode 421 and the annular electrode 422 are disposed on a same plane, and the distance between an outer periphery of the center electrode 421 and an inner periphery of the annular electrode 422 is d1. Further, the plane on which the center electrode 411 and the annular electrode 412 are disposed and the plane on which the center electrode 421 and the annular electrode 422 are disposed are kept substantially in parallel. One end of the inductor 423 is connected to the center electrode 421, and the other end is connected to one end of the connection line 425. One end of the inductor 424 is connected to the annular electrode 422, and the other end is connected to one end of the connection line 426. The connection lines 425, 426 are, for example, constituted of a coaxial cable or a balanced cable. Other ends of the connection lines 425, 426 are connected respectively to input terminals of a not-illustrated load. By connecting the load to the power reception coupler 420 by the connection lines 425, 426, a power reception device is constituted. Note that a resonance frequency $f_c$ of a series resonance circuit due to capacitance C of a capacitor formed by the center electrode 421 and the annular electrode 422 and inductance L of the inductors 423, 424 is set to be the same as that of the power transmission coupler 410.

Figure 25:
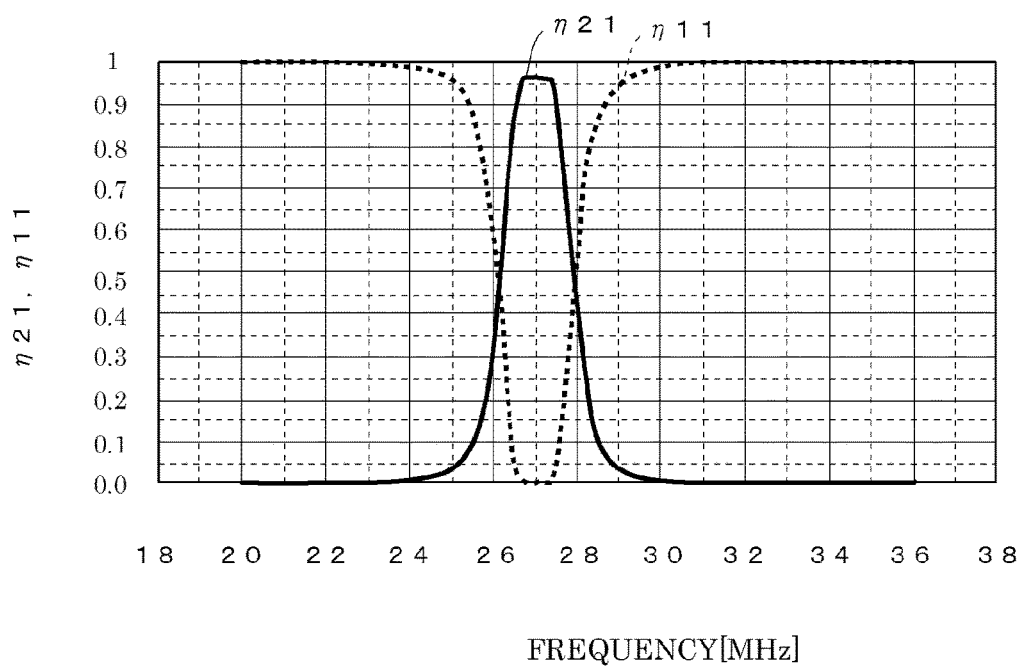
FIG. 25 is a diagram illustrating frequency characteristics of transmission efficiency and reflection loss in an example illustrated in FIG. 24.

FIG. 25 is a diagram illustrating frequency characteristics of transmission efficiency η21 (=|S21|$^2$) from the power transmission coupler 410 to the power reception coupler 420 and reflection loss η11 (=|S11|$^2$) in the case where the power transmission coupler 410 and the power reception coupler 420 of the wireless power transmission system illustrated in FIG. 24 are disposed to oppose each other across a distance of 20 cm (the case where d2=20 cm). More particularly, the radius r1 of the center electrodes 411, 421 is 7 cm, the radius R of outer peripheries of the annular electrodes 412, 422 is 24 cm, the width w of the annular electrodes 412, 422 is 1.5 cm, and d1 is set to 15.5 cm. In FIG. 25, the horizontal axis denotes frequency (MHz) of transmitted alternating-current power, and the vertical axis denotes transmission efficiency.

In the example illustrated in FIG. 24, a transmission efficiency of about 96% is achieved around 27 MHz.

Figure 26:
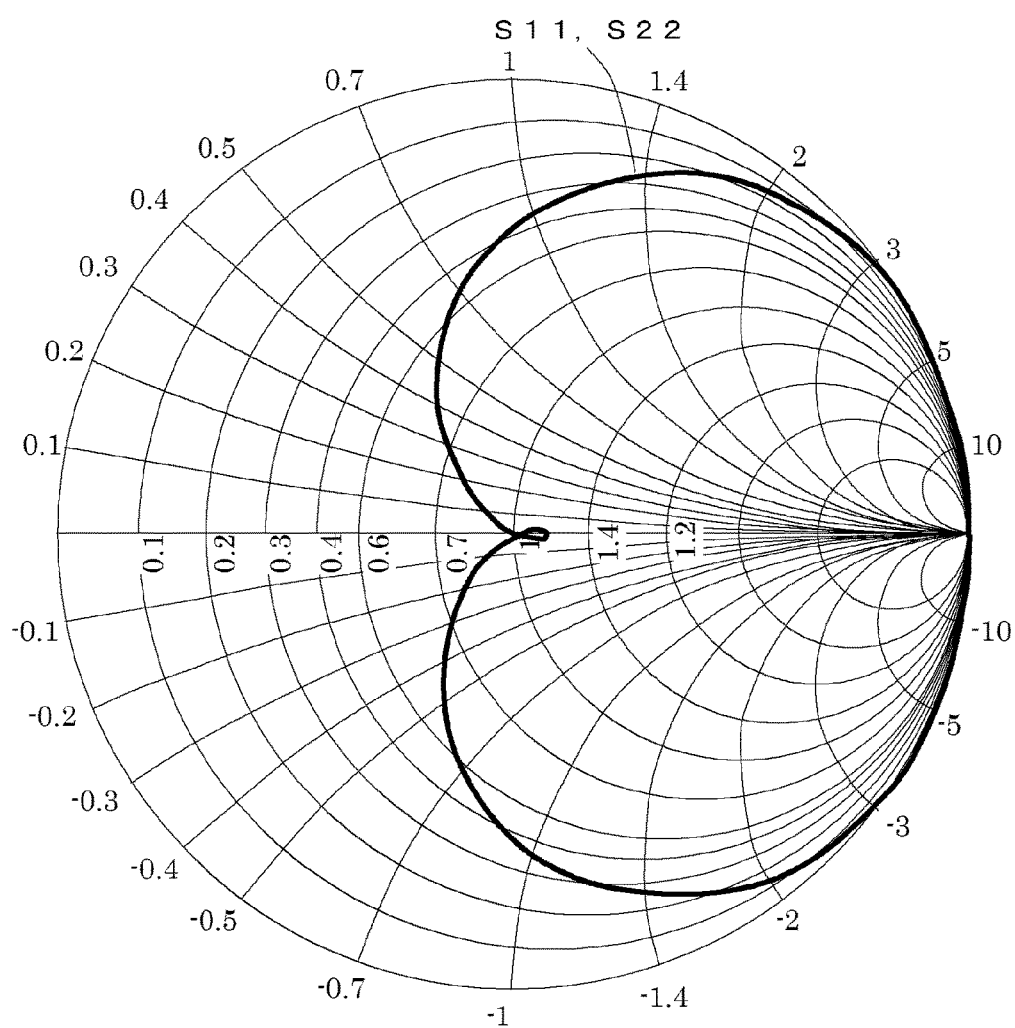
FIG. 26 is a diagram illustrating a smith chart of impedance of a power transmission coupler of the example illustrated in FIG. 24.

FIG. 26 illustrates a smith chart of impedance S11 of the power transmission coupler 410 of the wireless power transmission system illustrated in FIG. 24. In this case, a port impedance of the measuring apparatus is set to a value equal to a characteristic impedance Z0 (real value) of a connection line. As illustrated in this diagram, in the wireless power transmission system illustrated in FIG. 24, a trajectory of impedance of the power transmission coupler 410 passes near the center of circle of the smith chart, and thus power can be transmitted efficiently while suppressing reflections by setting to perform transmission near the center.

That is, in the structure illustrated in FIG. 24, the center electrode 411 and the annular electrode 412 are coupled by electric field resonance to the center electrode 421 and the annular electrode 422, and alternating-current power is transmitted by an electric field from the center electrode 411 and the annular electrode 412 to the center electrode 421 and the annular electrode 422. That is, in the embodiment illustrated in FIG. 24, since the center electrode 411 and the annular electrode 412 and the center electrode 421 and the annular electrode 422 are disposed across the distance d2 shorter than $\lambda/2\pi$ as a near field, the center electrode 421 and the annular electrode 422 are disposed in an area where electric field components emitted from the center electrode 411 and the annular electrode 412 are dominant. Further, a resonance frequency due to the capacitor formed between the center electrode 411 and the annular electrode 412 and the inductors 413, 414 and a resonance frequency due to the capacitor formed between the center electrode 421 and the annular electrode 422 and the inductors 423, 424 are set to be substantially equal. Thus, since the center electrode 411 and the annular electrode 412 are coupled by electric field resonance to the center electrode 421 and the annular electrode 422, the alternating-current power is transmitted efficiently from the power transmission coupler 410 to the power reception coupler 420 by the electric field.

Figure 27:
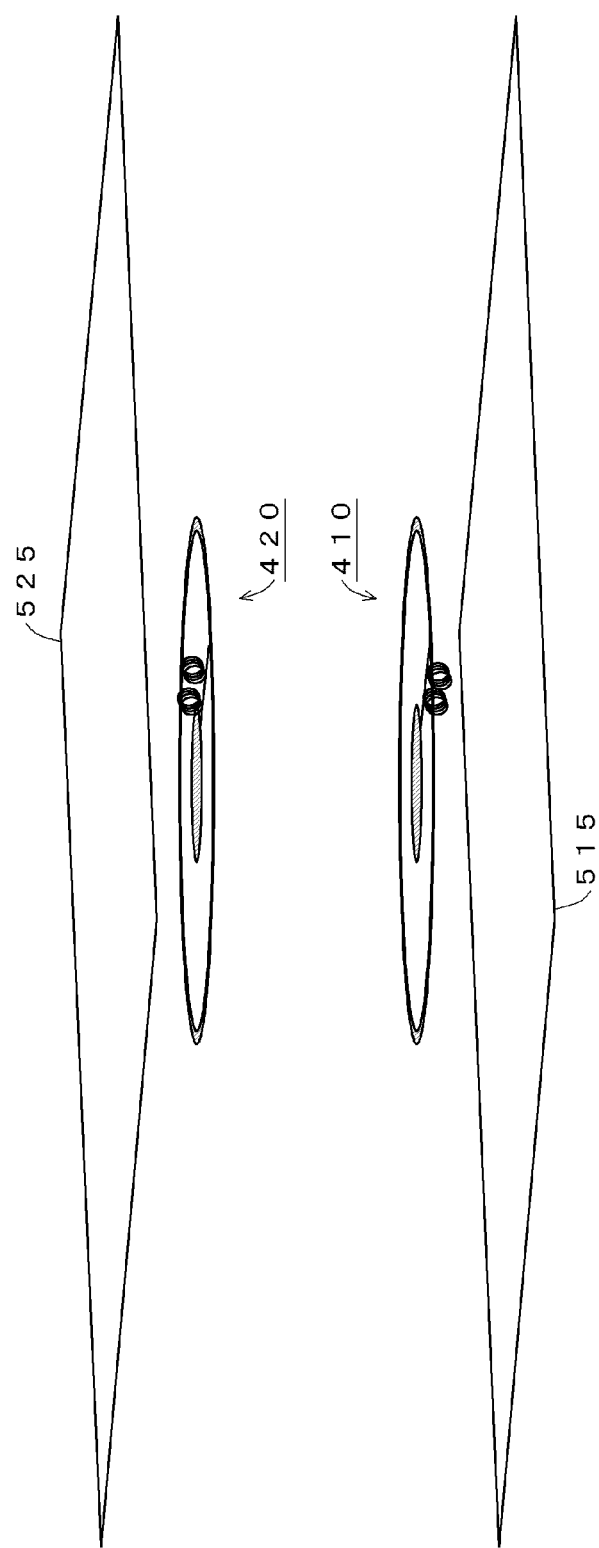
FIG. 27 is a view illustrating a state that ground plates are disposed in the vicinities of power transmission/reception couplers of the example illustrated in FIG. 24.
Figure 28:
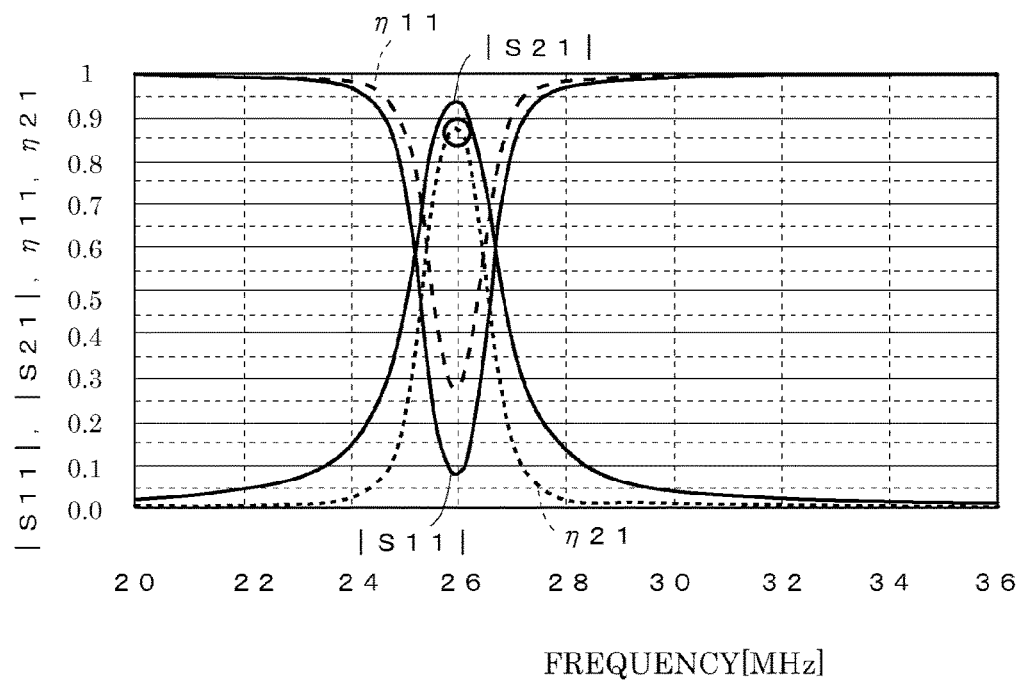
FIG. 28 is a diagram illustrating frequency characteristics of transmission efficiency and reflection loss in the state illustrated in FIG. 27.
Figure 29:
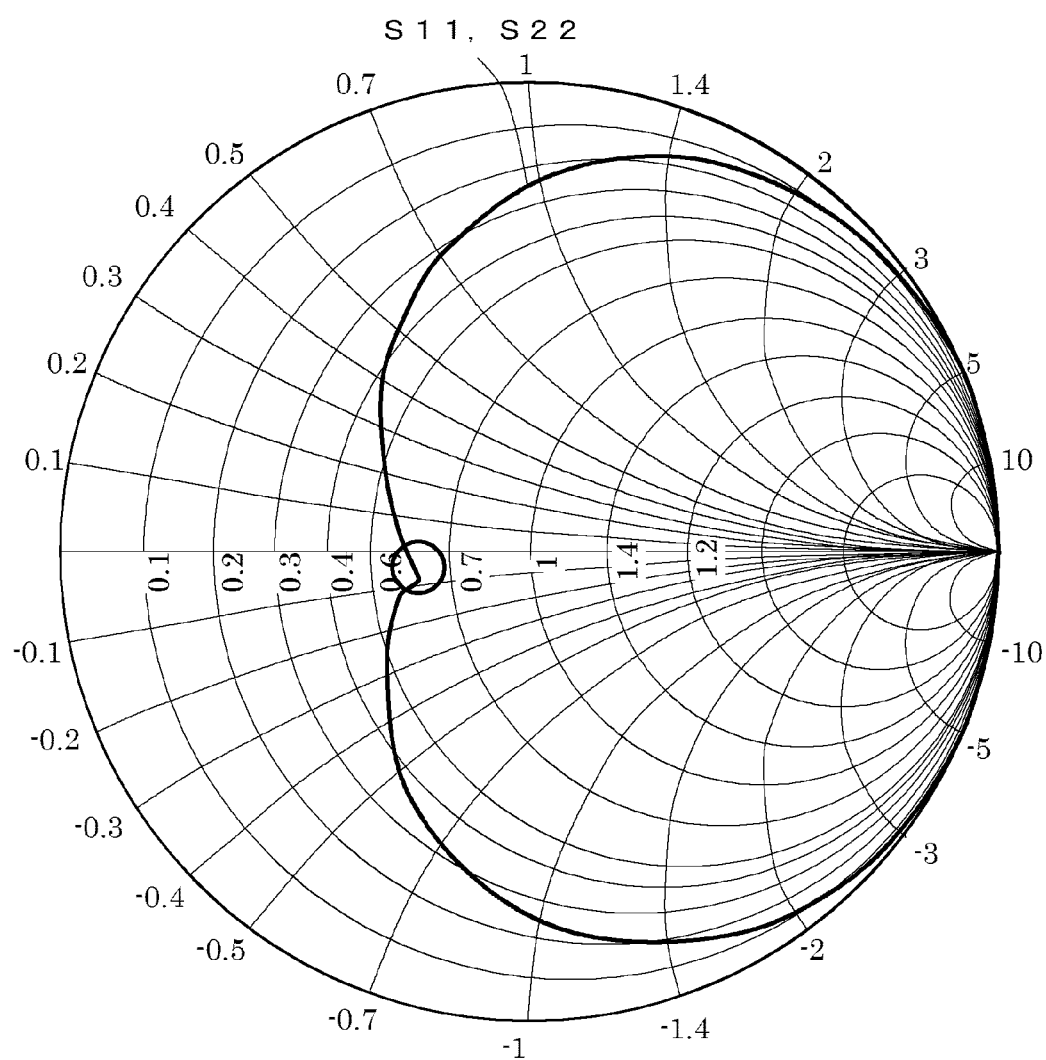
FIG. 29 is a diagram illustrating a smith chart of impedance of a power transmission coupler illustrated in FIG. 27.

FIG. 27 illustrates a state that ground plates 515, 525 are disposed in the vicinities of the power transmission coupler 410 and the power reception coupler 420 of the wireless power transmission system illustrated in FIG. 24. Note that in this example, the distance between the ground plate 515 and the power transmission coupler 410 and the distance between the ground plate 525 and the power reception coupler 420 are set to about 80 mm. FIG. 28 is a diagram illustrating frequency characteristics of transmission efficiency η21 from the power transmission coupler 110 to the power reception coupler 120, reflection loss η11, and absolute values of impedances S11, S21 in the state illustrated in FIG. 27. FIG. 29 illustrates a smith chart of impedance S11 of the power transmission coupler 110 of the wireless power transmission system in the state illustrated in FIG. 27. As illustrated in FIG. 27 and FIG. 28, the resonance frequency decreases from 27 MHz in the case of FIG. 24 to 25.9 MHz, the impedance decreases from 50Ω to 28Ω, and also the transmission efficiency decreases from 95% to 87%.

Figure 30:
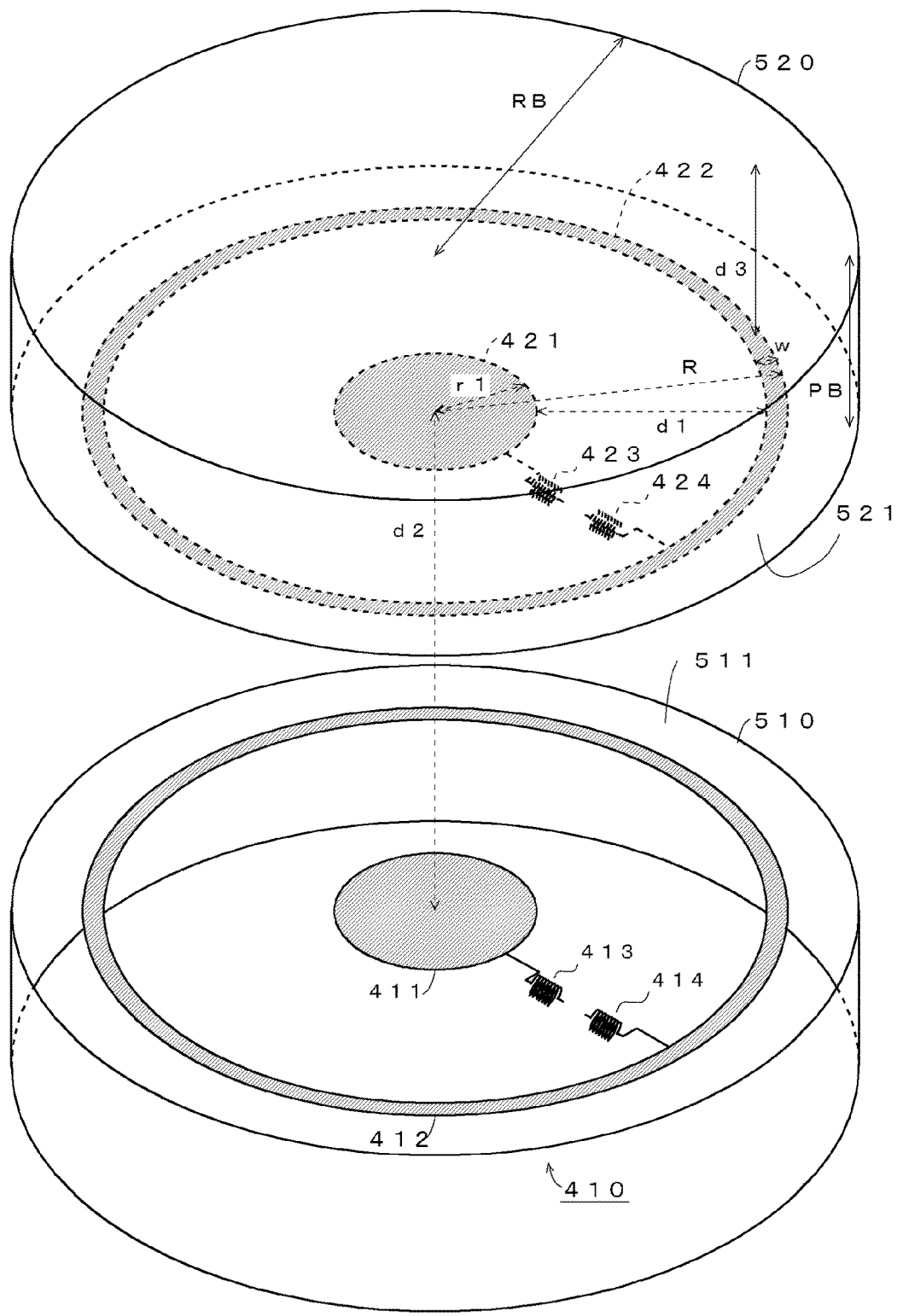
FIG. 30 is a view illustrating a structural example of the second embodiment of the present invention.
Figure 31:
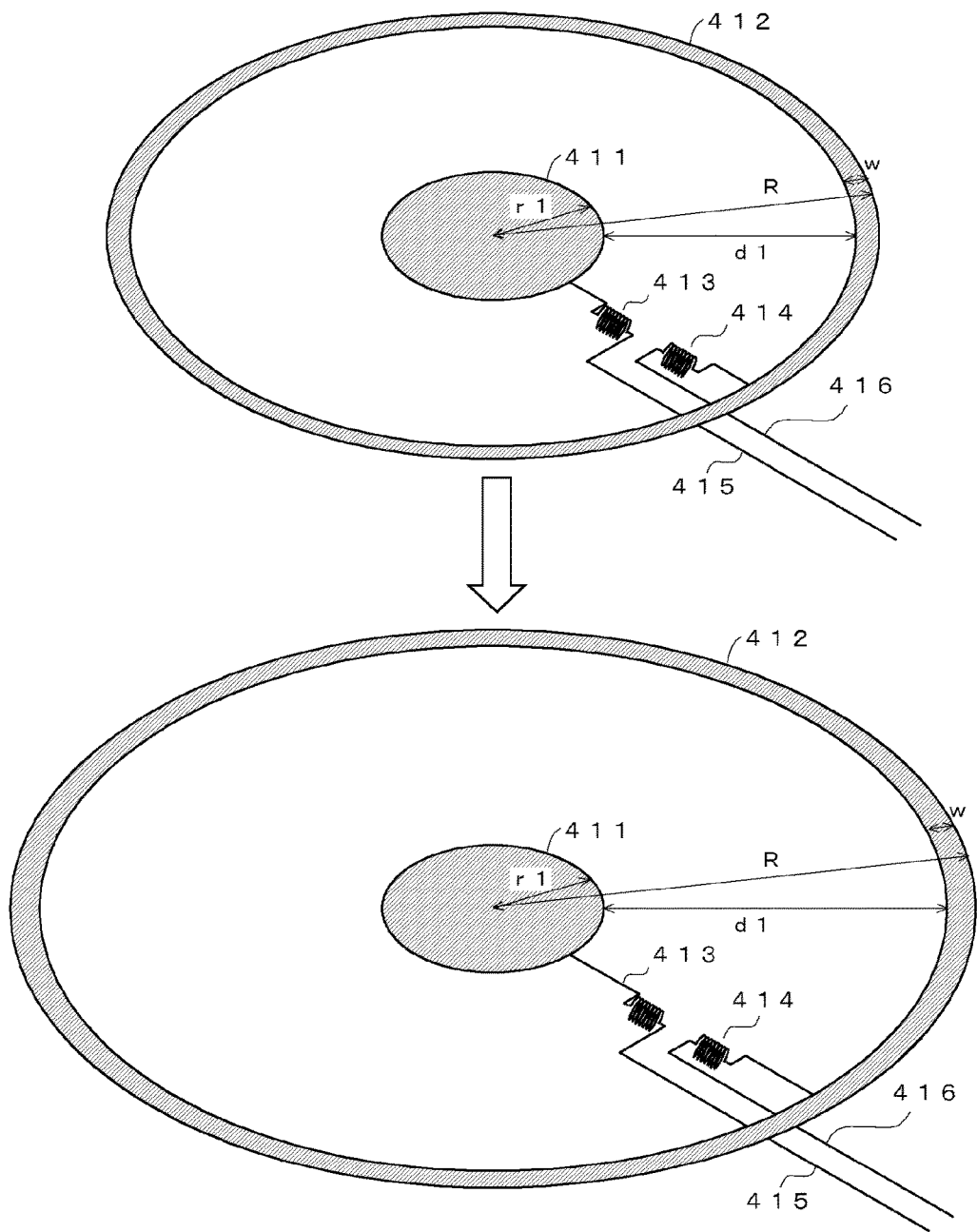
FIG. 31 is a view illustrating a modification example for not allowing a change in characteristic when housed in the casing.

FIG. 30 is a diagram illustrating a structural example of the second embodiment of the present invention. In the second embodiment, a casing 510 and a casing 520 having a cylindrical shape are added to the power transmission coupler 410 and the power reception coupler 420 which are illustrated in FIG. 24. Note that the structure other than this is similar to the case of FIG. 24. The casing 510 is constituted of a conductive member with a cylindrical shape having an opening 511. The power transmission coupler 410 is disposed in this opening 511. The casing 520 is constituted of a conductive member with a cylindrical shape having an opening 521. As the conductive member, for example, a good conductive member such as copper or aluminum can be used. Note that when the electrodes illustrated in FIG. 24 are merely housed in the casings, resonance frequencies change due to the influence of the casings. Accordingly, in the second embodiment, by adjusting sizes of the two electrodes as illustrated in FIG. 31, the coupling coefficient between the couplers is increased to compensate the impedance. More specifically, in FIG. 31, a radius of the center electrodes 411, 421 is changed from 70 mm to 90 mm, a radius of the annular electrodes 412, 422 is changed from 240 mm to 290 mm, and a width thereof is changed from 15 mm to 25 mm. By such adjustment, the coupling coefficient between the couplers is increased to compensate the impedance.

Here, settings to satisfy the following expressions (4), (5) are made among RB, R, d2, PB, d3 illustrated in FIG. 30. Note that RB denotes an inside radius of the casings 510, 520, R denotes a radius of the annular electrodes 412, 422, d2 denotes a distance between the couplers at a time of resonance, PB denotes a depth of the casings 510, 520, and d3 denotes a distance from the electrodes 412, 422 to the bottom surface of the casings 510, 520.

$$RB \geq 1.1 \times R \tag{4}$$

$$PB \geq d3 \geq d2/2 \tag{5}$$

Here, when RB is close to R, casing side surfaces are close to the coupler electrodes. Thus, the electric field coupling of the electrodes of the couplers and the casing side surfaces intensifies and the electric field coupling between the transmission/reception couplers weakens. In this case, a decrease in input impedance of the couplers and a reduction in transmission distance occur. Thus, RB needs to be equal to or more than a predetermined value relative to R. When the transmission/reception distance is 20 cm assuming EV (Electric Vehicle) and other power transmission, impedance matching is achieved if RB of about 1.2 times R can be secured, enabling good power transmission. Further, regarding PB, on the principle of mirror image, if a value equal to or more than half the opposing distance d2 of the power transmission/reception couplers can be secured, impedance matching is achieved and good power transmission is enabled.

Figure 32:
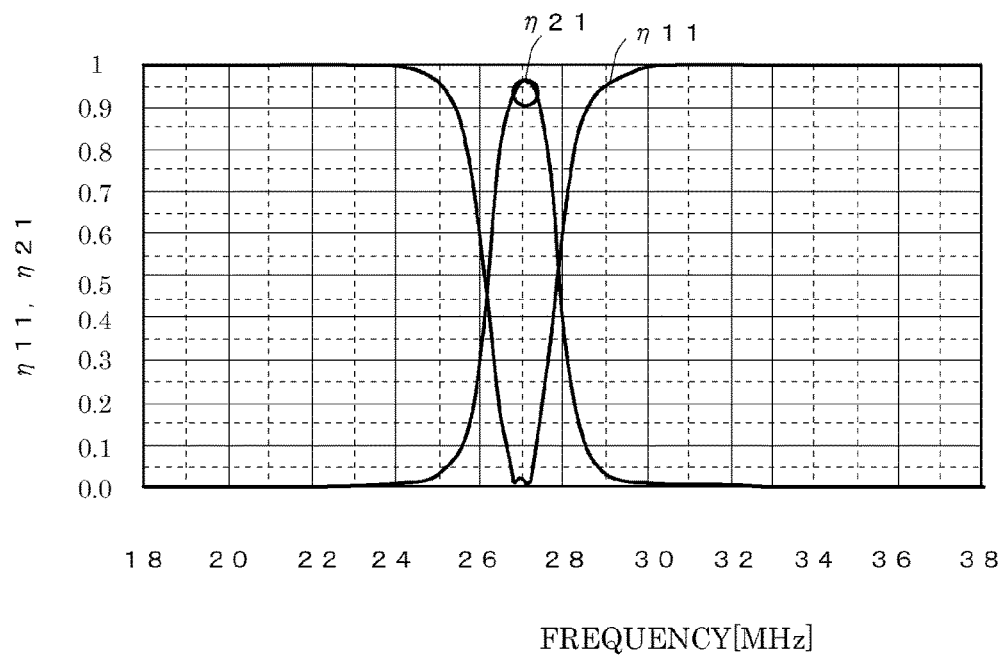
FIG. 32 is a diagram illustrating frequency characteristics of transmission efficiency and reflection loss of the second embodiment illustrated in FIG. 30.
Figure 33:
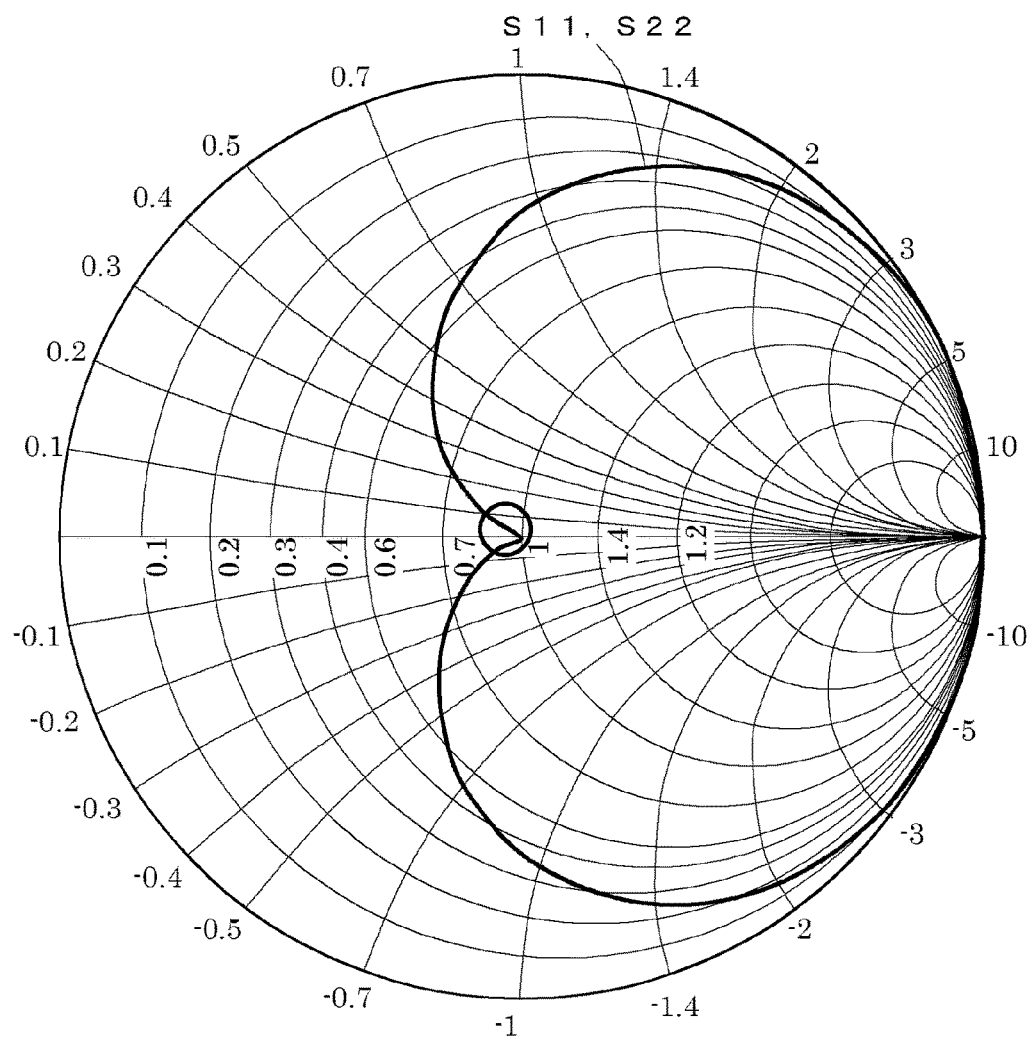
FIG. 33 is a diagram illustrating a smith chart of impedance of a power transmission coupler of the second embodiment illustrated in FIG. 30.

FIG. 32 is a diagram illustrating frequency characteristics of transmission efficiency η21 from the power transmission coupler 110 to the power reception coupler 120 and reflection loss η11 in the second embodiment illustrated in FIG. 30. Note that in this example, the radius of the center electrodes 411, 421 is set to 60 mm, the radius of the annular electrodes 412, 422 is set to 290 mm, the distance between the power transmission/reception couplers is set to 200 mm, the radius of the casings 510, 520 is set to 340 mm, and the depth is set to 100 mm. FIG. 33 illustrates a smith chart of impedance S11 of the power transmission coupler 410 of the wireless power transmission system described in the second embodiment. As illustrated in FIG. 32 and FIG. 33, the resonance frequency is 27.1 MHz similarly to the case of FIG. 24, the impedance is 50Ω, and the transmission efficiency is 96%.

Figure 34:
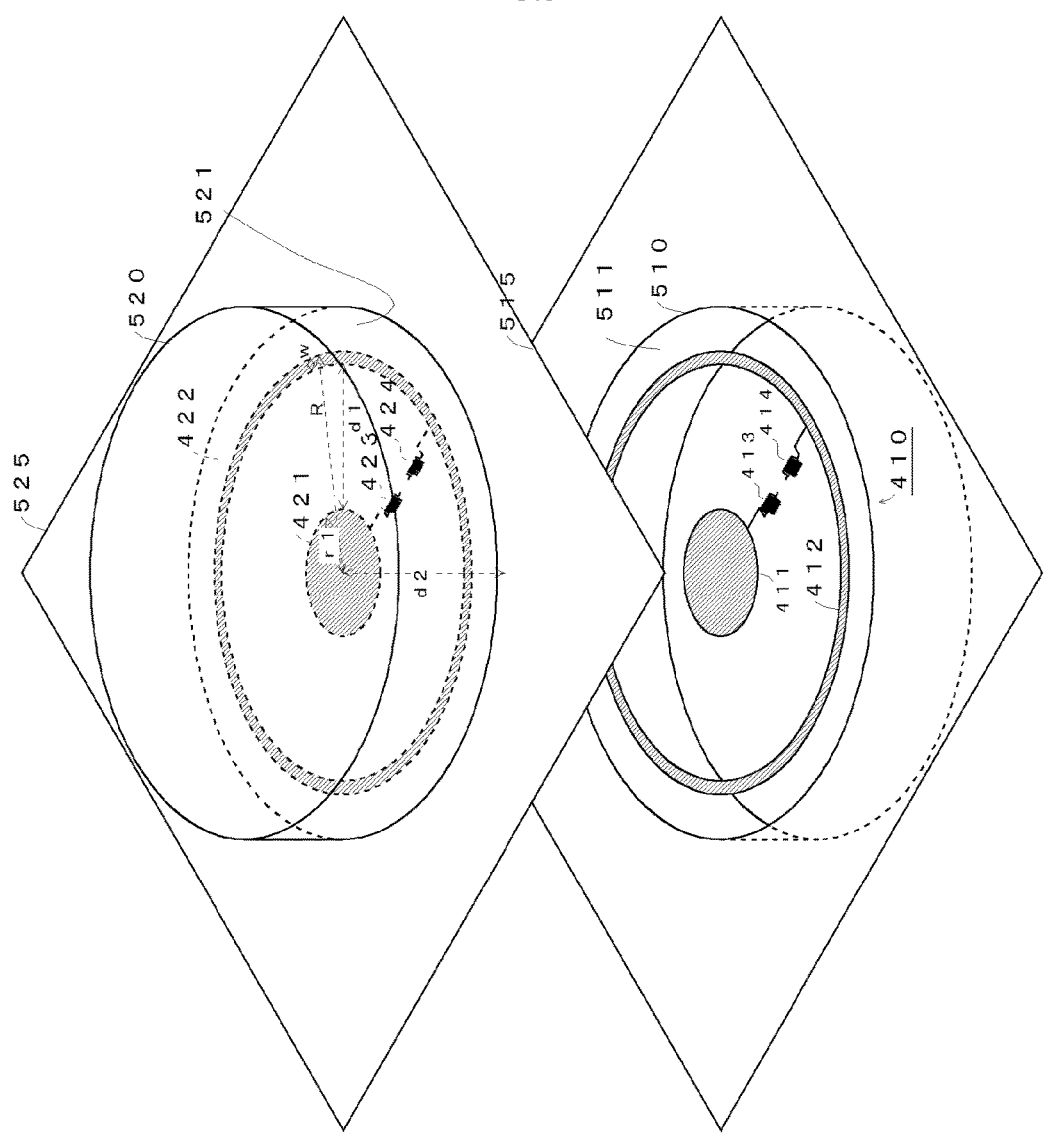
FIG. 34 is a view illustrating a state that ground plates are disposed in the vicinities of power transmission/reception couplers of the second embodiment illustrated in FIG. 30.
Figure 35:
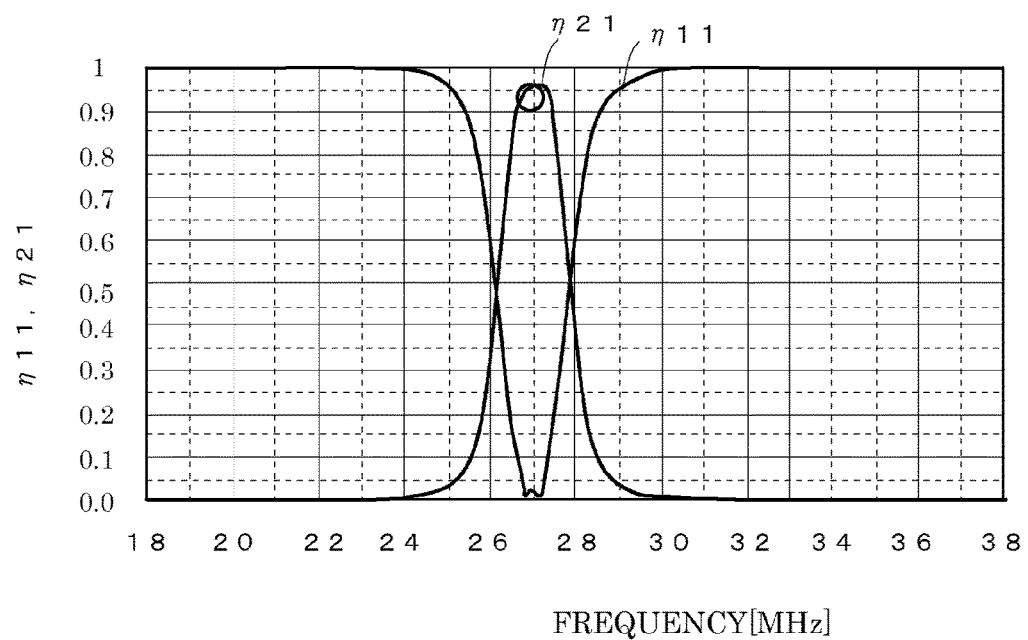
FIG. 35 is a diagram illustrating frequency characteristics of transmission efficiency and reflection loss in the state illustrated in FIG. 34.
Figure 36:
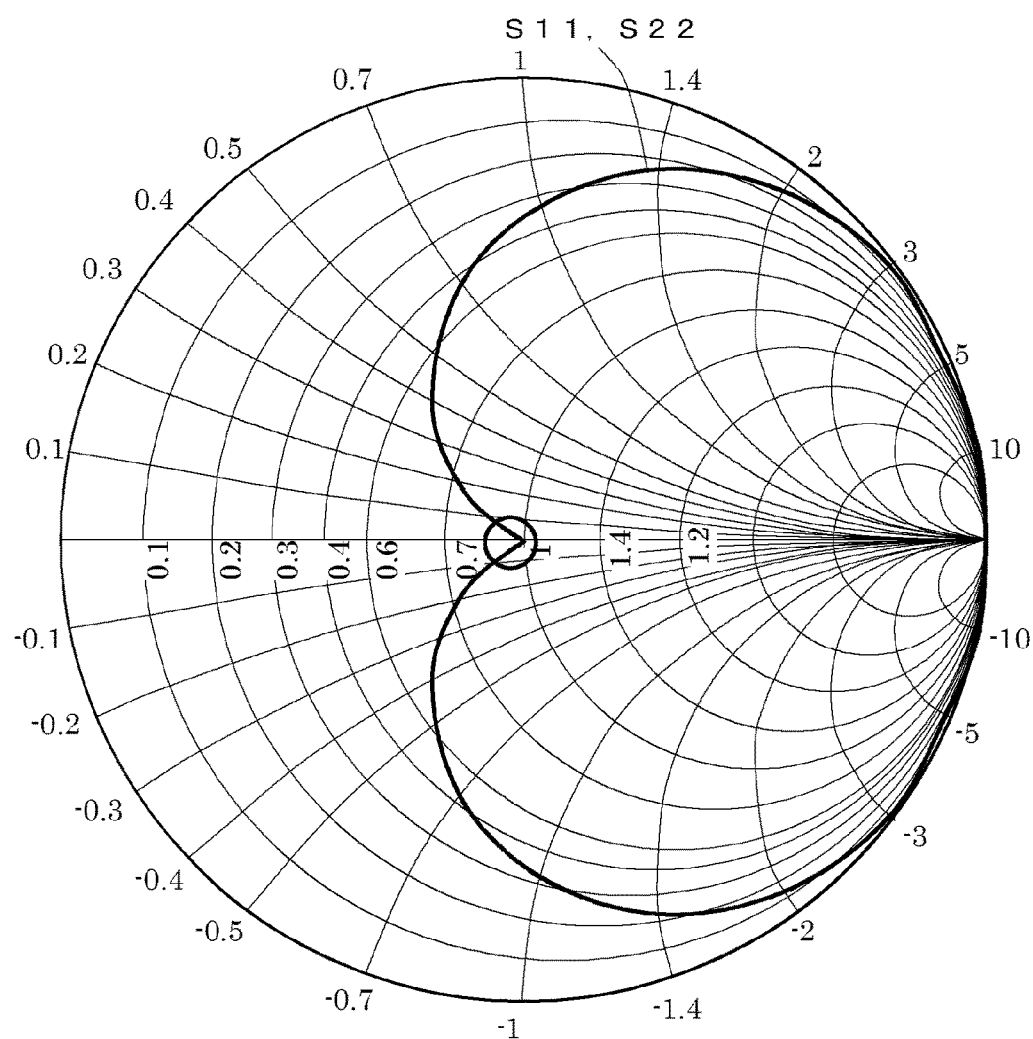
FIG. 36 is a diagram illustrating a smith chart of impedance of the power transmission coupler in a state illustrated in FIG. 34.

FIG. 34 illustrates a state that the ground plates 515, 525 similar to those of FIG. 27 are provided in the second embodiment illustrated in FIG. 30. Note that in the example of FIG. 34, the ground plates 515, 525 are disposed in the vicinities of the openings 511, 512 of the casings 510, 520. FIG. 35 is a diagram illustrating frequency characteristics of transmission efficiency η21 from the power transmission coupler 110 to the power reception coupler 120 and reflection loss η11 in the state illustrated in FIG. 34. FIG. 36 illustrates a smith chart of impedance S11 of the power transmission coupler 110 of the wireless power transmission system in the state illustrated in FIG. 34. As illustrated in FIG. 35 and FIG. 36, the resonance frequency is 27 MHz similarly to the case of FIG. 24, the impedance is 50Ω, and the transmission efficiency is 96%. Consequently, in the second embodiment, it can be seen that even when the ground plates 515, 525 are provided in the vicinities of the openings 511, 521, the frequencies and characteristics are not affected by the ground plates.

Figure 37:
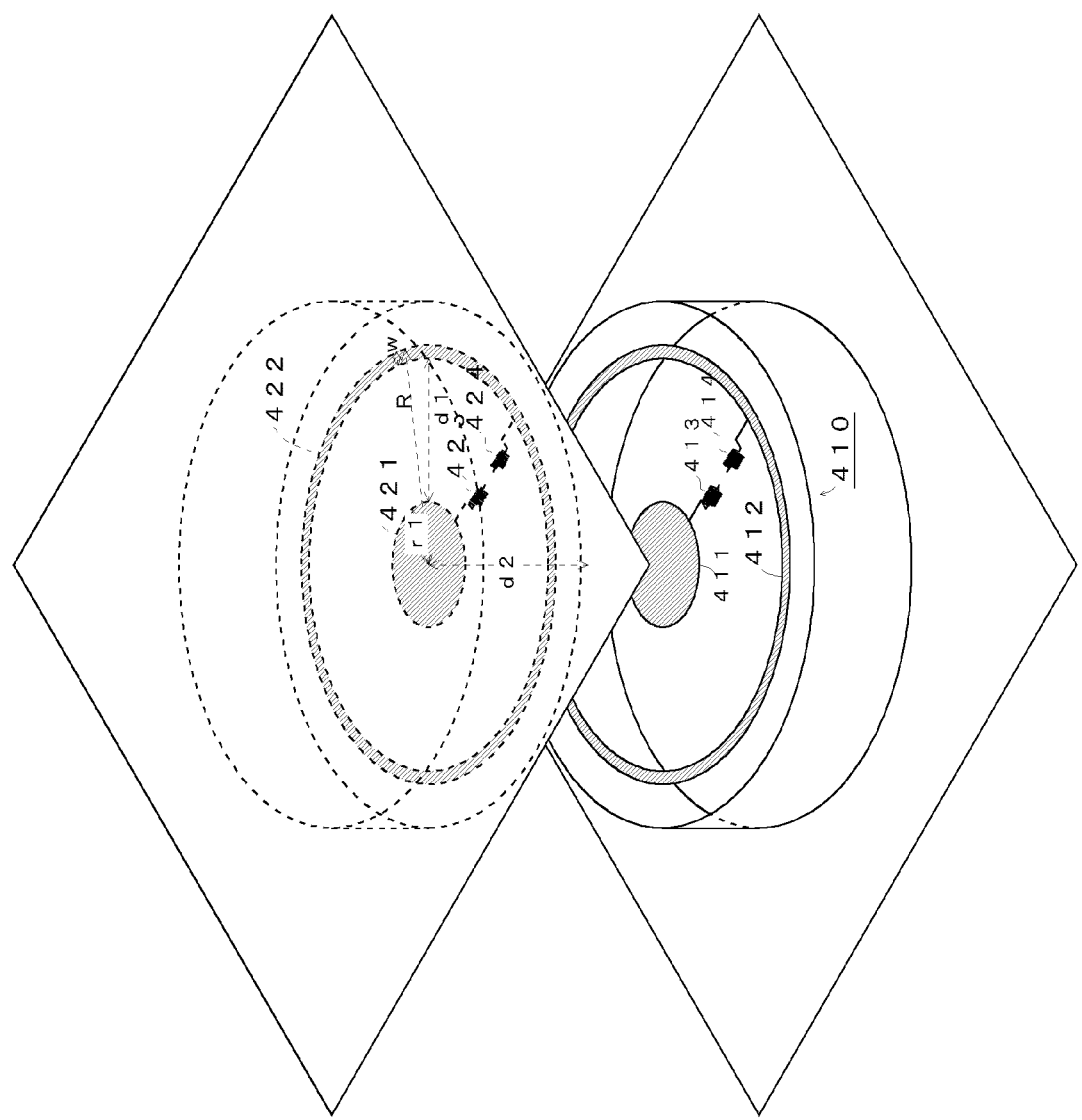
FIG. 37 is a view illustrating a state that ground plates are disposed in the vicinities of power transmission/reception couplers of the second embodiment illustrated in FIG. 30.
Figure 38:
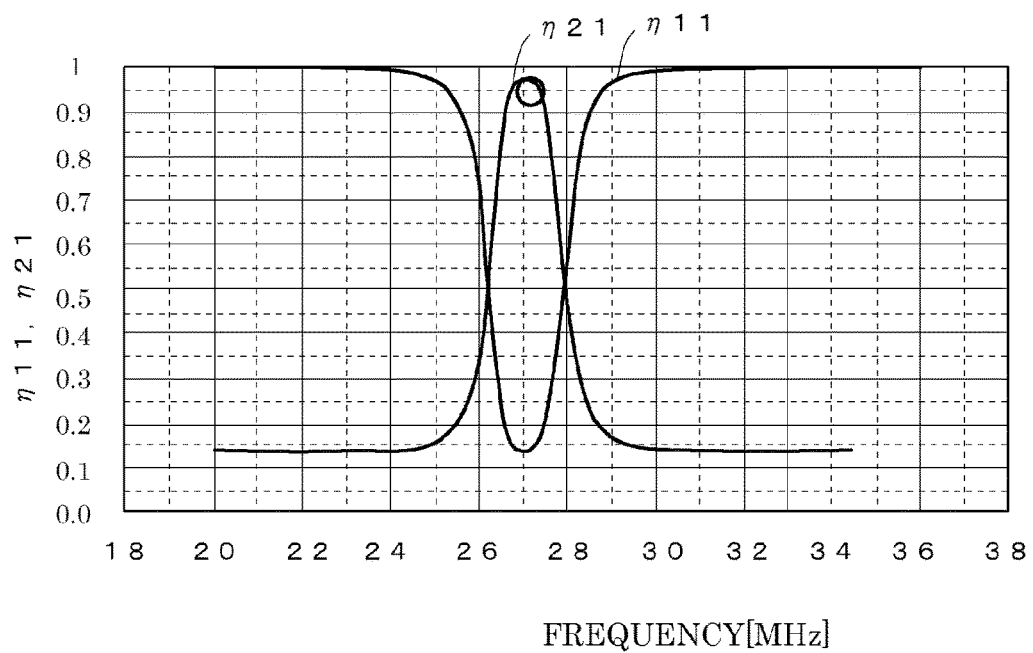
FIG. 38 is a diagram illustrating frequency characteristics of transmission efficiency and reflection loss in the state illustrated in FIG. 37.
Figure 39:
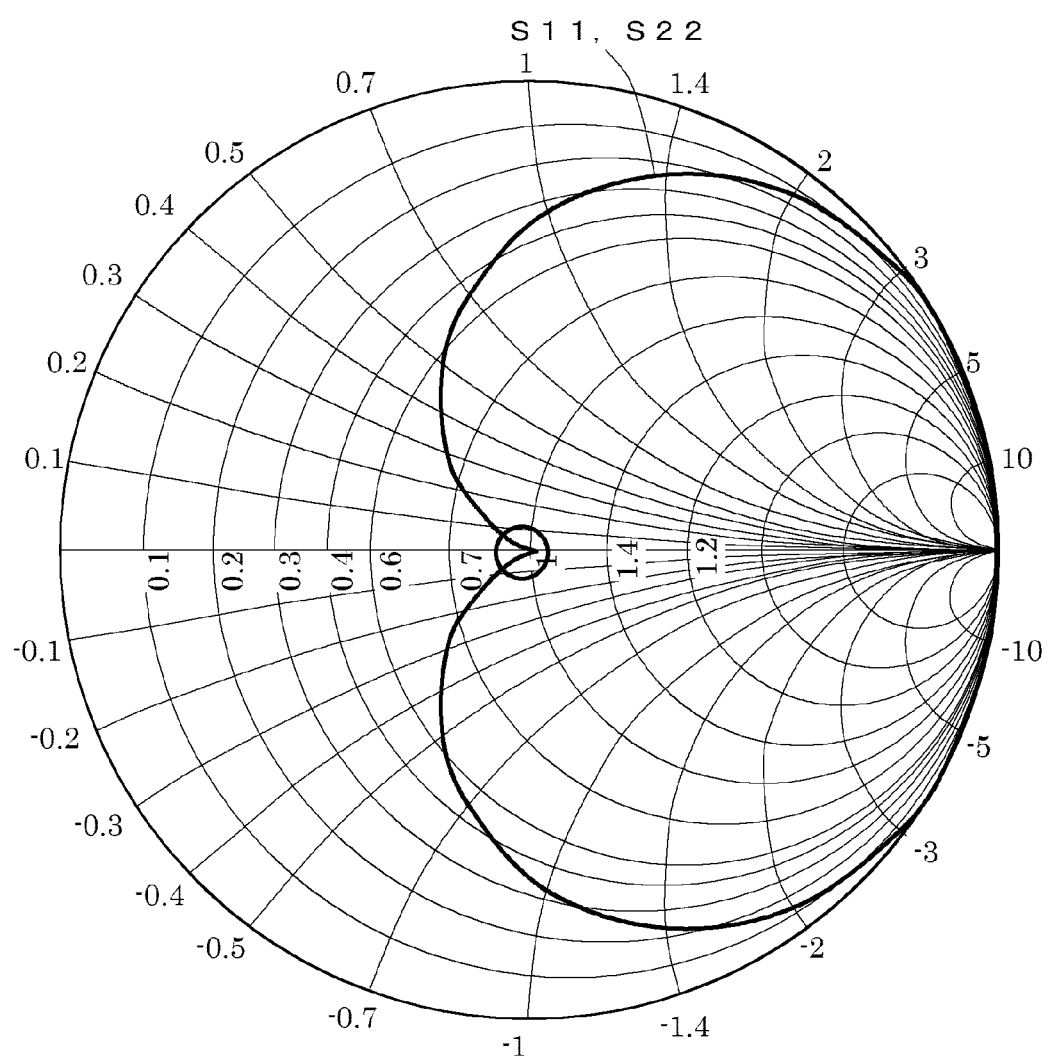
FIG. 39 is a diagram illustrating a smith chart of impedance of the power transmission coupler in the state illustrated in FIG. 37.

FIG. 37 illustrates a state that the ground plates 515, 525 are disposed in the vicinities of bottom surfaces of the casings 510, 520 similarly to FIG. 27, with respect to the second embodiment illustrated in FIG. 30. FIG. 38 is a diagram illustrating frequency characteristics of transmission efficiency η21 from the power transmission coupler 110 to the power reception coupler 120 and reflection loss η11 in the state illustrated in FIG. 37. FIG. 39 illustrates a smith chart of impedance S11 of the power transmission coupler 110 of the wireless power transmission system in the state illustrated in FIG. 37. As illustrated in FIG. 38 and FIG. 39, the resonance frequency is 27.1 MHz similarly to the case of FIG. 24, the impedance is 50Ω, and the transmission efficiency is 96%. Consequently, in the second embodiment, it can be seen that even when the ground plates 515, 525 are provided in the vicinities of the bottom surfaces, the frequencies and characteristics are not affected by the ground plates.

(D) Description of a Third Embodiment of the Present Invention

Figure 40:
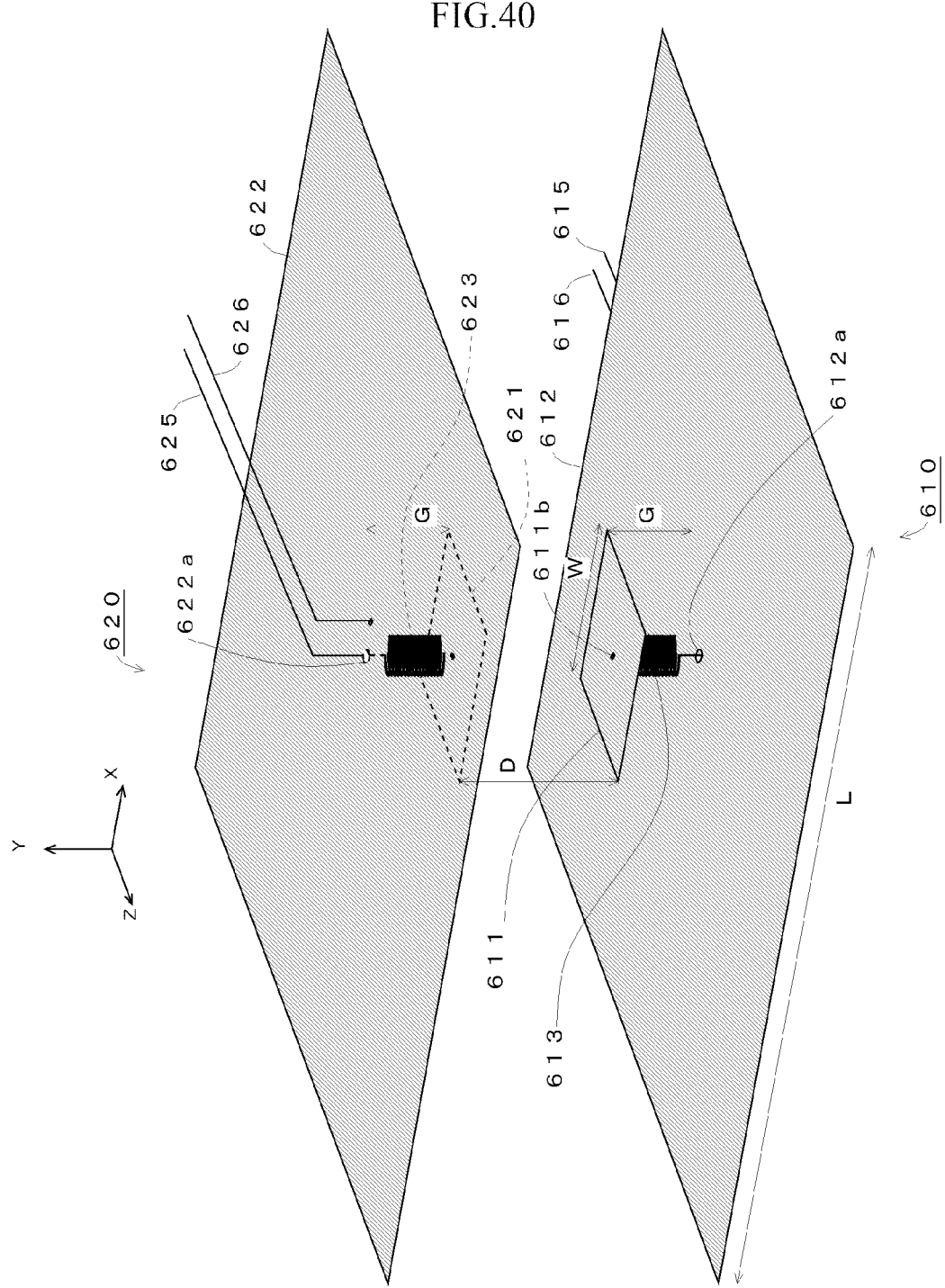
FIG. 40 is a view for explaining the principles of a third embodiment of the present invention.

Next, a basic structure of a wireless power transmission system according to a third embodiment of the present invention will be described with reference to FIG. 40 to FIG. 50. First, basic principles of the third embodiment will be described. FIG. 40 is a view for explaining the principles of the third embodiment. In the example illustrated in this view, the wireless power transmission system has a power transmission coupler 610 and a power reception coupler 620. The power transmission coupler 610 has an electrode 611 having a rectangular shape, an electrode 612 likewise having a rectangular shape, an inductor 613, and connection lines 615, 616. The power reception coupler 620 has an electrode 621 having a rectangular shape, an electrode 622 likewise having a rectangular shape, an inductor 623, and connection lines 625, 626. The electrodes 611, 612, 621, 622 are constituted of, for example, a conductive plate member such as copper or aluminum.

Note that the electrodes 611, 621 have a square shape whose length of one side is W, and the electrodes 612, 622 have a square shape whose length of one side is L. Further, the interval between the electrode 611 and the electrode 612 is G, the interval between the electrode 621 and the electrode 622 is G, and the interval between the electrode 611 and the electrode 621 is D. Here, the relation of W, D, L can be set to satisfy, for example, the following expressions (6), (7). Further, L can be set equal to or more than several times G. Note that in the following, as one example, the description will be given taking the case where D=200 mm, G=100 mm, L=1000 mm as an example.

$$G \geq D/2 \tag{6}$$

$$G \geq W/2 \tag{7}$$

Here, the expression (6) is a condition based on a mirror image effect, which will be described later, that the electric field coupling of the electrodes 611, 621 becomes equal to or more intense than the electric field coupling of the electrode 611 and the electrode 612 or the electrode 621 and the electrode 622. When the width of the electrode 611 is narrow relative to the interval between the electrode 611 and the electrode 612, a fringing field amount occurring between the electrode 611 and the electrode 612 increases. Similarly, when the width of the electrode 621 is small compared to the interval between the electrode 621 and the electrode 622, a fringing field amount occurring between the electrode 621 and the electrode 622 increases. By increase of the fringing field amount, the electric field coupling of the power transmission coupler 610 and the power reception coupler 620 becomes easy to occur. The expression (7) indicates a condition for this.

The inductor 613 is disposed to fit within, for example, a space sandwiched by the electrode 611 and the electrode 612, and the inductor 623 is disposed to fit within a space sandwiched by the electrode 621 and the electrode 622. In the example of FIG. 40, the inductor 613 is disposed in the vicinity of a center of the electrode 611, and the inductor 623 is disposed in the vicinity of a center of the electrode 621.

Figure 41:
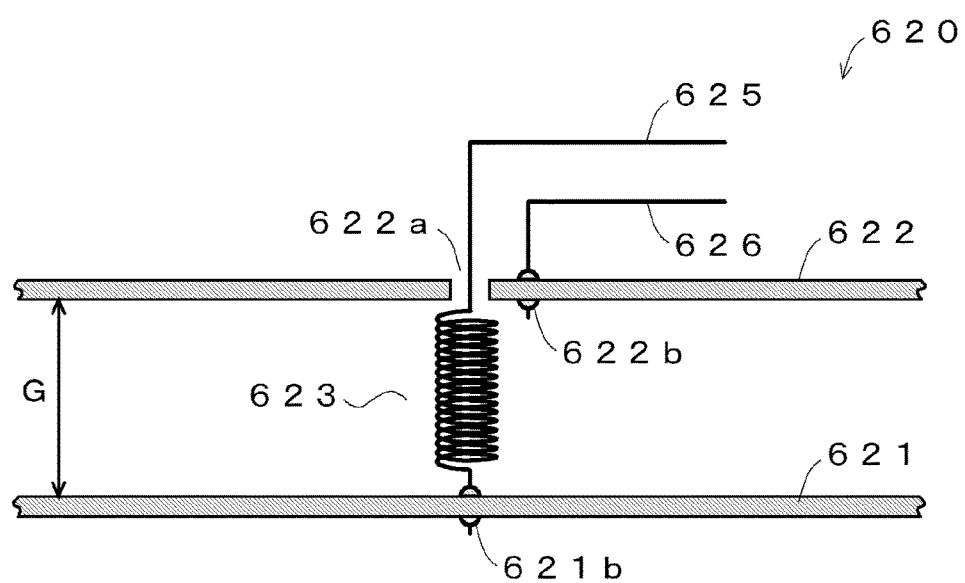
FIG. 41 is a view illustrating a detailed structure around an inductor of FIG. 40.

FIG. 41 is a cross-sectional view illustrating a structure around the inductor 623 of the power reception coupler 620 illustrated in FIG. 40. As illustrated in FIG. 41, one terminal of the inductor 623 is connected electrically to a center part of the electrode 621 of the power reception coupler 620 by a joint part 621*b* by solder or welding. Another terminal of the inductor 623 is connected to the connection line 625. The connection line 625 is drawn to the outside of the electrode 622 via a through hole 622*a* provided in a center part of the electrode 622. Further, in the vicinity of the through hole 622*a* of the electrode 622, the connection line 626 is connected electrically by a joint part 622*b* by solder or welding. In this structure, the power reception coupler 620 exhibits an electric property of series resonance, and an equivalent circuit thereof is similar to FIG. 3. In a state of not being coupled to the power transmission coupler 610, the input impedance in the resonance frequency is substantially 0Ω. In a state of being coupled to the power transmission coupler 610, the input impedance increases accompanying increase in coupling amount. Note that the power transmission coupler 610 has the same structure as the power reception coupler 620, and thus its description is omitted. The power transmission coupler 610 also has an electric property of series resonance.

Figure 42:
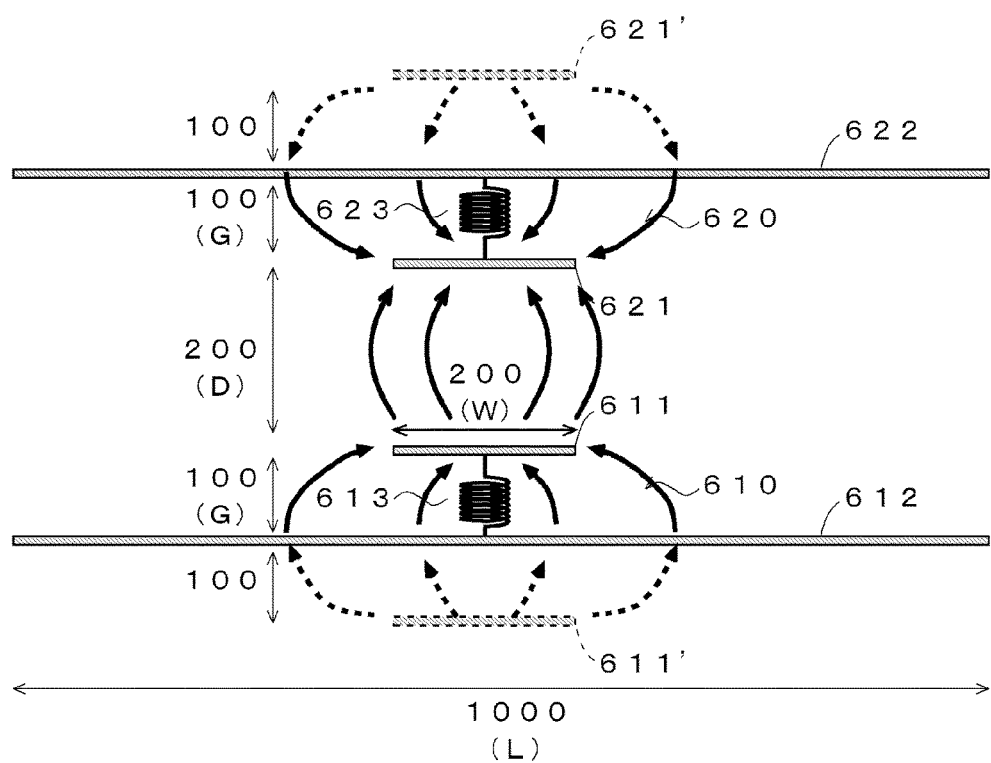
FIG. 42 is a view for explaining operation principles of the structure of FIG. 40.

FIG. 42 is a view for explaining operation of the embodiment. In this embodiment, as illustrated in FIG. 42, the electrode 612 functions as ground, and thus a mirror image 611' of the electrode 611 is formed in a position of line symmetry across the electrode 612. Similarly, the electrode 622 functions as ground, and thus a mirror image 621' of the electrode 621 is formed in a position of line symmetry across the electrode 622. To increase the coupling amount for transmission/reception, it is desired to increase the coupling amount of 611 and 621 more than the coupling amount of 611 and 611' of the power transmission coupler or the coupling amount of 621, 621' of the power reception coupler. From the positional relation of the electrodes, if D≥2 G or less, the coupling amount of 611 and 621 is larger than the coupling amount of 611 and 611' of the power transmission coupler or the coupling amount of 621, 621' of the power reception coupler. That is, this positional relation corresponds to the above expression (6). In other words, when it becomes an electrode disposition satisfying the expression (6), the electric field coupling of the power transmission coupler 610 and the power reception coupler 620 intensifies, and thus the transmission distance can be extended.

Figure 43:
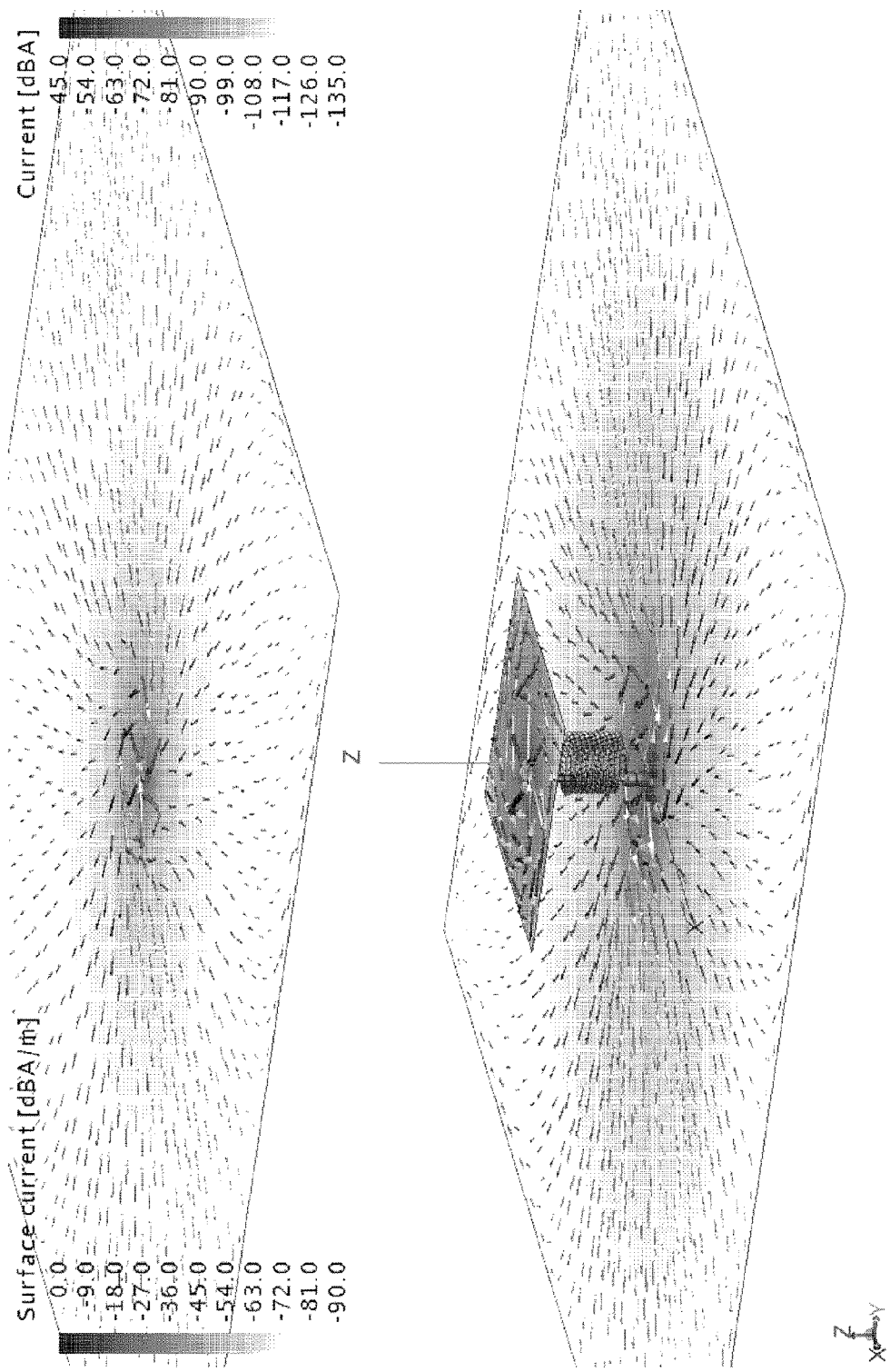
FIG. 43 is a view illustrating a simulation result of electric current distribution of the embodiment illustrated in FIG. 40.

FIG. 43 is a view illustrating a simulation result of electric current distribution of a basic mode of the third embodiment. Note that in this simulation, the electrodes 612, 622 have the size of 1000 mm×1000 mm (L=1000 mm), and the electrodes 611, 621 have the size of 200 mm×200 mm (W=200 mm). Further, the interval between the electrode 611 and the electrode 612 is 100 mm (G=100 mm), the interval between the electrode 621 and the electrode 622 is 100 mm (G=100 mm), and the interval between the electrode 611 and the electrode 621 is 200 mm (D=200 mm). Further, the inductors 613, 623 have a diameter of 42 mm, a length of 39.6 mm, and the number of windings of 10. As illustrated in FIG. 43, the current is distributed symmetrically about the inductors 113, 123, and it can be easily determined that a magnetic field and an electric field accompanying therewith are also distributed symmetrically.

Figure 44:
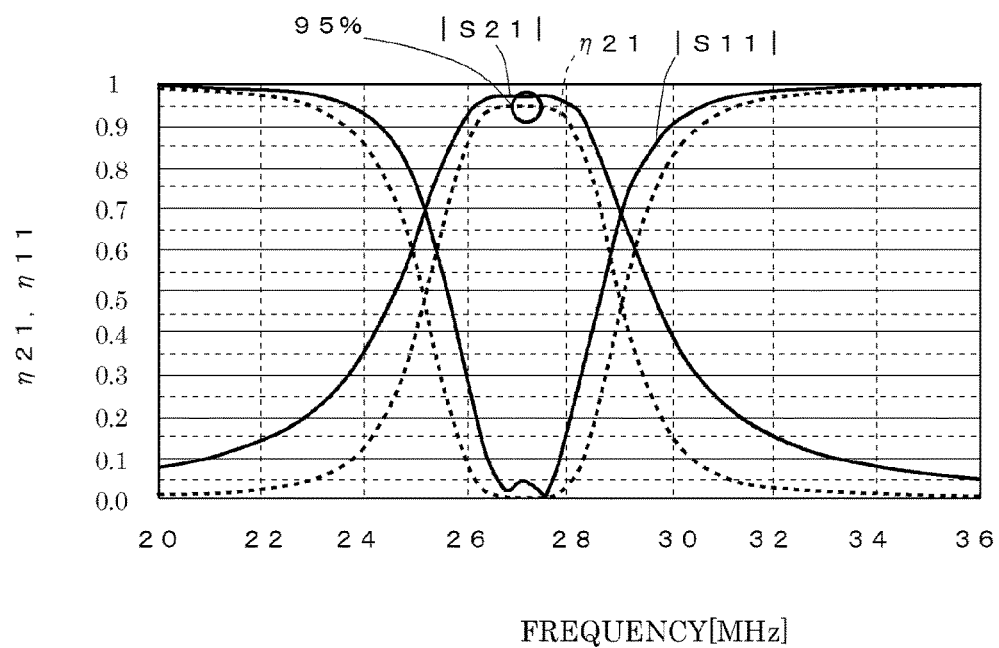
FIG. 44 is a diagram illustrating frequency characteristics of transmission efficiency and reflection loss of the embodiment illustrated in FIG. 40.

FIG. 44 is a diagram illustrating frequency characteristics of transmission efficiency η21 from the power transmission coupler 610 to the power reception coupler 620 and reflection loss η11 in the case where the power transmission coupler 610 and the power reception coupler 620 of the basic mode of the third embodiment illustrated in FIG. 40 are disposed to oppose each other across a distance of 200 mm (when D=200 mm). In this diagram, the horizontal axis denotes frequency (MHz) of transmitted alternating-current power, and the vertical axis denotes transmission efficiency. In the example illustrated in FIG. 44, a transmission efficiency of about 95% is achieved around 27 MHz.

Figure 45:
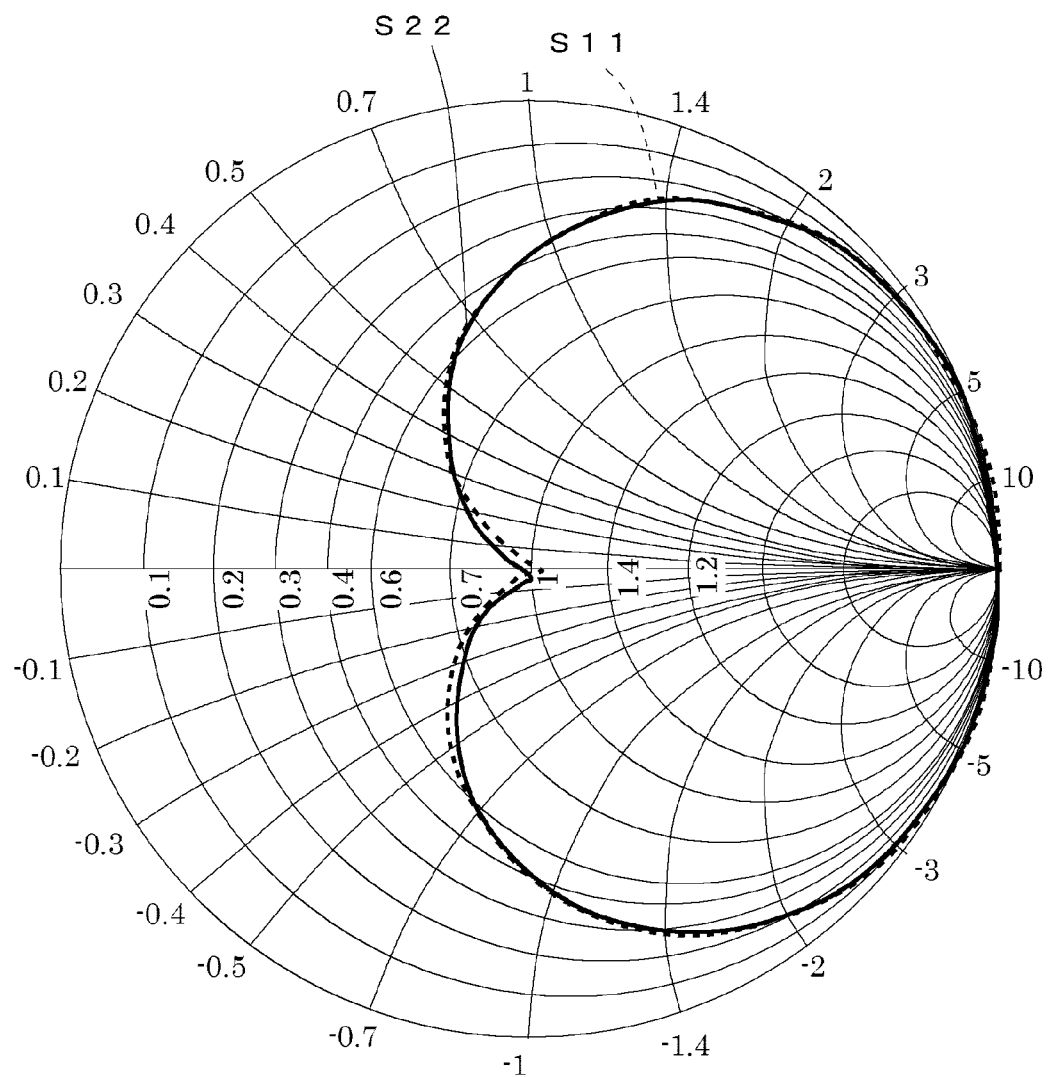
FIG. 45 is a diagram illustrating a smith chart of impedance of a power transmission coupler illustrated in FIG. 40.

FIG. 45 illustrates a smith chart of impedance S11 of the power transmission coupler 610 of the basic mode of the third embodiment illustrated in FIG. 40. In this case, a port impedance of the measuring apparatus is set to a value equal to a characteristic impedance Z0 (real value) of a connection line. As illustrated in this diagram, in the embodiment illustrated in FIG. 40, a trajectory of impedance of the power transmission coupler 610 and the power reception coupler 620 passes near the center of circle of the smith chart, and thus power can be transmitted efficiently while suppressing reflections by setting to perform transmission near the center.

Figure 46:
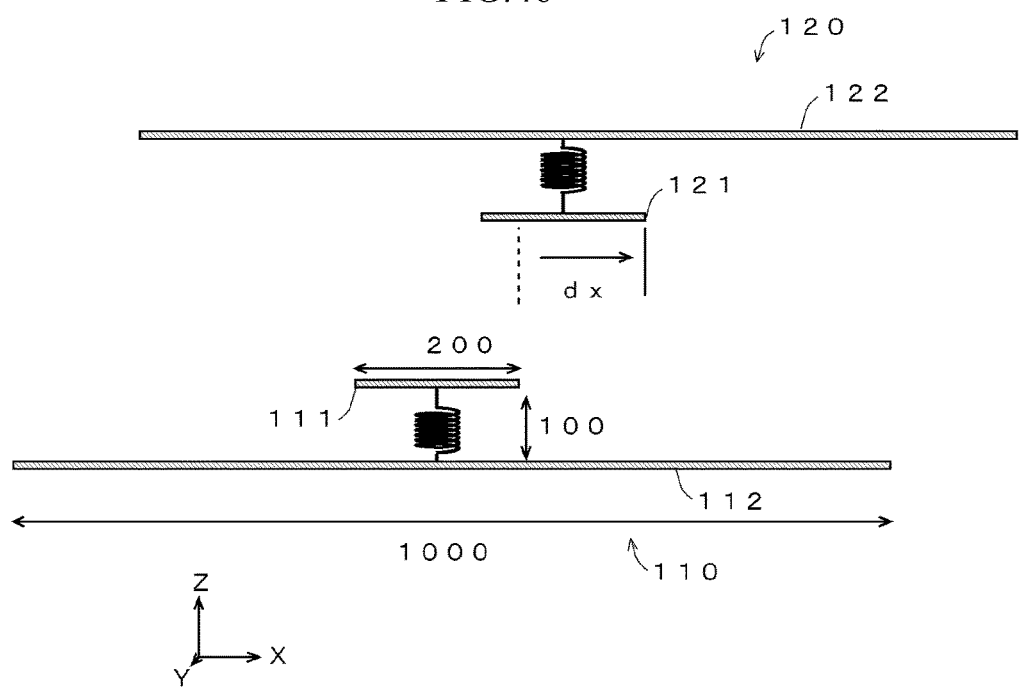
FIG. 46 is a view illustrating a state that the power transmission coupler is offset in an X direction in the embodiment illustrated in FIG. 40.
Figure 47:
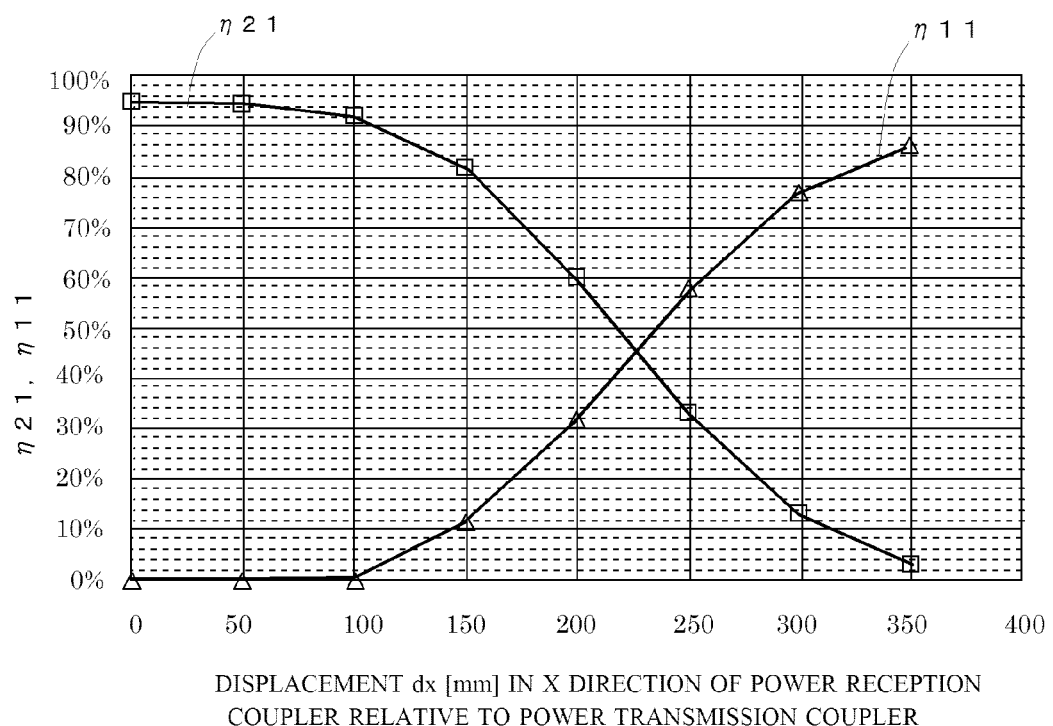
FIG. 47 is a diagram illustrating the relation of a positional displacement dx illustrated in FIG. 46 and power transmission efficiency and reflection loss.

FIG. 46 is a view illustrating a state that the power reception coupler 620 is displaced by dx in the X direction relative to the power transmission coupler 610 of the basic mode of the third embodiment illustrated in FIG. 40, and FIG. 47 is a diagram illustrating the relation of a displacement amount of the power reception coupler 620 and the transmission efficiency and the reflection loss. In FIG. 47, the horizontal axis denotes a displacement dx in the X direction illustrated in FIG. 46, and the vertical axis denotes the transmission efficiency η21 and the reflection loss η11. As illustrated in FIG. 47, the transmission efficiency attenuates gradually according to the displacement dx, and a null point as a singular point does not exist. Further, as long as it is a displacement of 150 mm or less, the transmission efficiency of 80% or more can be achieved. Note that even when the direction of displacement is changed in the Y direction, similar effects can be obtained. That is, a directional property of characteristic change due to the displacement does not occur.

Figure 48:
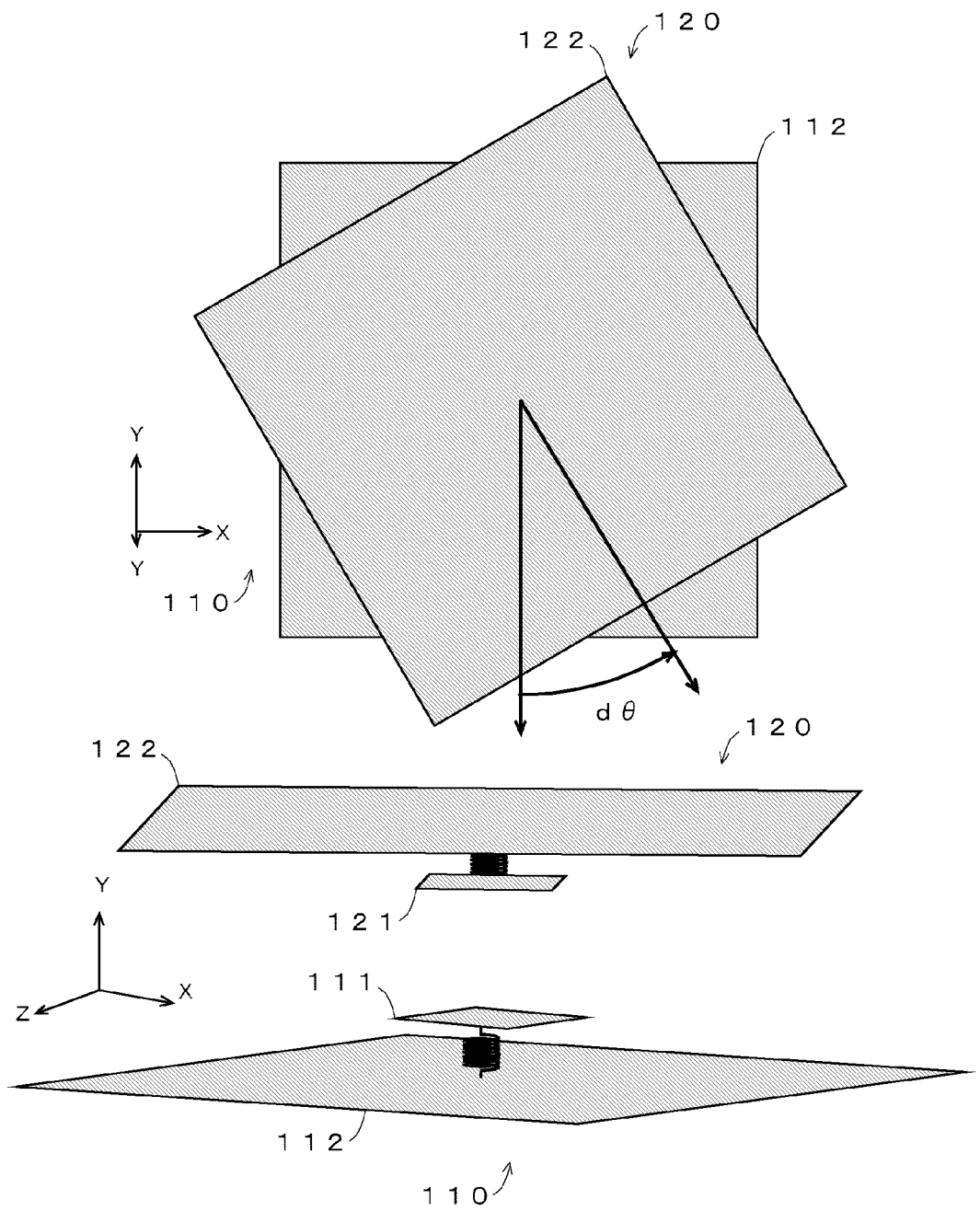
FIG. 48 is a view illustrating a state that a power reception coupler is rotated by dθ about a Y axis in the embodiment illustrated in FIG. 40.
Figure 49:
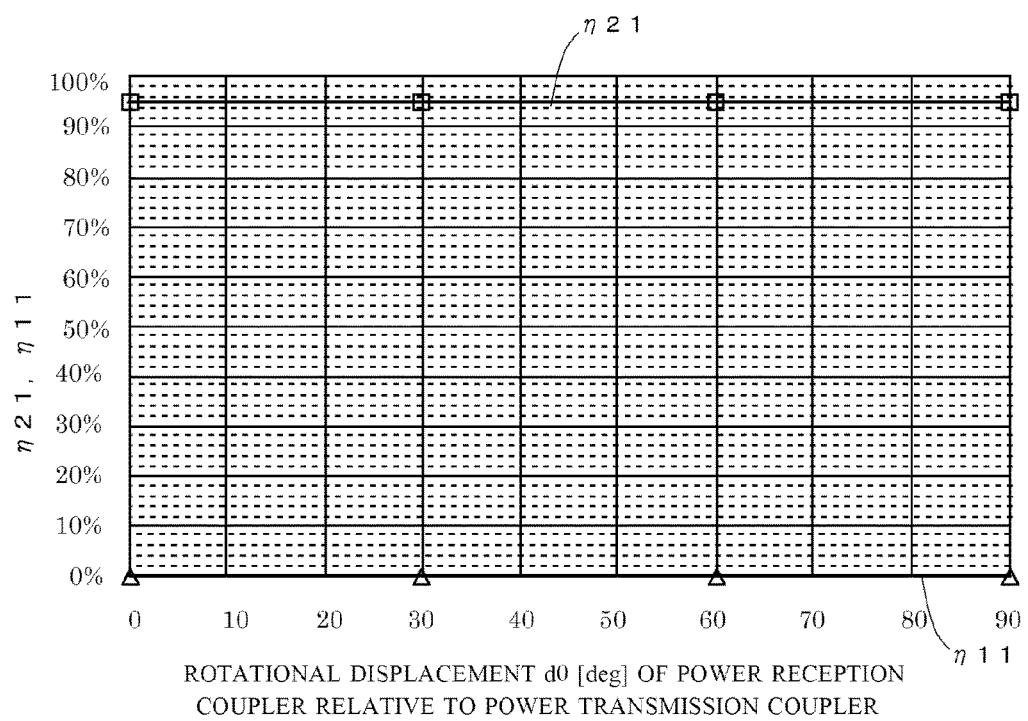
FIG. 49 is a diagram illustrating the relation of a rotational displacement dθ illustrated in FIG. 46 and power transmission efficiency and reflection loss.

FIG. 48 illustrates a state of having a rotational displacement of dθ of the power reception coupler 620 about the Y axis relative to the power transmission coupler 610 of the basic mode of the third embodiment illustrated in FIG. 40. FIG. 49 is a diagram illustrating changes in transmission efficiency and reflection loss with respect to the rotational displacement dθ. In FIG. 49, the horizontal axis denotes the rotational displacement dθ of the power reception coupler 620 relative to the power transmission coupler 610, and the vertical axis denotes the transmission efficiency η21 and the reflection loss η11. As illustrated in this diagram, the graphs of the transmission efficiency η21 and the reflection loss η11 are flat, and there is hardly any change in transmission efficiency and reflection loss with respect to the rotational displacement dθ.

As described above, according to the basic mode of the third embodiment of the present invention, deterioration in transmission characteristics can be reduced also with respect to positional displacement and rotational displacement.

Figure 50:
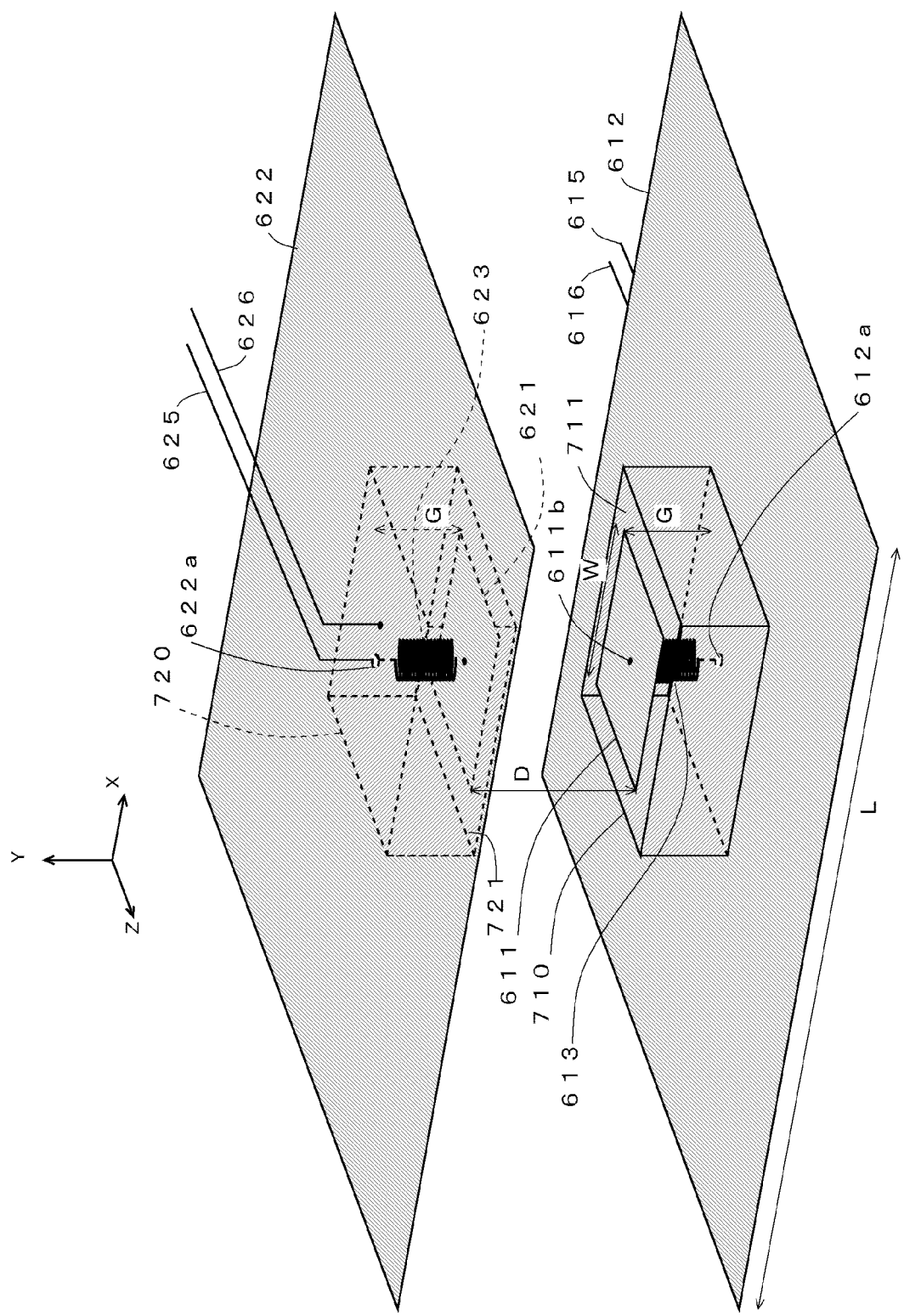
FIG. 50 is a view for explaining a third embodiment of the present invention.

FIG. 50 is a view illustrating a structural example of the third embodiment of the present invention. In the example of FIG. 50, casings 710, 720 are added as compared to FIG. 40. The structure other than this is similar to the case of FIG. 40. The casing 710 is constituted of a good conductive member such as copper or aluminum and has an opening 711. In a center of this opening 711, the electrode 611 is disposed. Further, a bottom surface of the casing 710 is electrically connected to the electrode 612. The casing 720 is also constituted of a good conductive member such as copper or aluminum and has an opening 721. In a center of this opening 721, the electrode 621 is disposed. Further, a bottom surface of the casing 720 is electrically connected to the electrode 622. In this example in which the casings are added, the function to reduce deterioration in transmission characteristics with respect to positional displacement and rotational displacement is inherited.

In the case of the third embodiment illustrated in FIG. 50, similarly to the case of the first and second embodiments, by shielding effects of the casings 710, 720, even when ground plates are disposed in close vicinity, the influence thereof can be reduced.

(D) Variant Embodiments

In the above embodiments, both the power transmission coupler and the power reception coupler are housed in the casings, but it may be structured to house one of them. For example, only a coupler which easily affected by a ground plate may be housed. Note that in this case, an adjustment may be made so that resonance frequencies of the power transmission coupler and the power reception coupler are the same.

In the above embodiments, the opening of a casing is in an open state, but for example, a radome made of resin may be provided on the opening. By providing the radome in this manner, the electrodes can be protected from physical forces and corrosion.

Further, in the above-described embodiments, any specific method for fixing the electrodes is not described, but for example, the electrodes may be fixed in the casings by a fixing member made of resin. Specifically, at least one or more columns made of resin are provided on rear surfaces of the electrodes, and the electrodes may be fixed with this column. Alternatively, the electrodes may be fixed to the above-described radome.

Further, in the above embodiments, the two inductors 113, 114 are residing between the connection lines 115, 116 and the electrodes 111, 112, but they may reside in only one of them. Similarly, the two inductors 123, 124 are residing between the connection lines 125, 126 and the electrodes 121, 122, but they may reside in only one of them.

Further, in the above embodiments, the inductors are formed by winding a conductive line in a columnar shape, but they may be formed of, for example, one having a shape meandering on a plane as used in a microstrip line, or one having a spiral shape on a plane.

EXPLANATION OF REFERENCE SIGNS 110 power transmission coupler
111, 112 electrode (first electrode, second electrode)
113, 114 inductor (first inductor)
115, 116 connection line
120 power reception coupler
121, 122 electrode (third electrode, fourth electrode)
123, 124 inductor (second inductor)
125, 126 connection line
310, 320 casing
311, 321 opening
410 transmission coupler
411, 421 center electrode (first electrode, third electrode)
412, 422 annular electrode (second electrode, fourth electrode)
420 power reception coupler
413, 414 inductor (first inductor)
423, 424 inductor (second inductor)
510, 520 casing
610 transmission coupler
611, 612 electrode (first electrode, second electrode)
621, 622 electrode (third electrode, fourth electrode)
613 inductor (first inductor)
623 inductor (second inductor)
710, 720 casing

The invention claimed is:

1. A wireless power transmission system transmitting alternating-current power wirelessly from a power transmission device to a power reception device, wherein
the power transmission device comprises:
a first and a second electrode which are disposed across a predetermined distance;
a first and a second connection line electrically connecting the first and the second electrode and two output terminals of an alternating-current power generating unit, respectively; and
a first inductor residing between the first and the second electrode and at least one of the two output terminals of the alternating-current power generating unit, and
the power reception device comprises:
a third and a fourth electrode which are disposed across a predetermined distance;
a third and a fourth connection line electrically connecting the third and the fourth electrode and two input terminals of a load, respectively; and
a second inductor residing between the third and the fourth electrode and at least one of the two input terminals of the load, wherein:
at least one of the first to the fourth electrode is housed in a conductive casing having an opening corresponding to an opposing electrode, and a resonance frequency of a power transmission coupler constituted of the first and the second electrode and the first inductor and a resonance frequency of a power reception coupler constituted of the third and the fourth electrode and the second inductor are set to be substantially equal,
the first and the second electrode constituting the power transmission coupler are juxtaposed across a predetermined distance on a first plane,
a total width including the predetermined distance is less than or equal to $\lambda/2\pi$ as a near field, the third and the fourth electrode constituting the power reception coupler are juxtaposed across a predetermined distance on a second plane in parallel to the first plane, total width including the predetermined distance is less than or equal to $\lambda/2\pi$ as a near field, at least one of the power transmission coupler and the power reception coupler is housed in the casing, and two electrodes constituting the coupler housed in the casing are disposed in the opening of the casing.

2. The wireless power transmission system according to claim 1, wherein the first to the fourth electrode have a same rectangular shape, two sides having a same length of the first electrode and the second electrode are disposed to oppose each other, and two sides having a same length of the third electrode and the fourth electrode are disposed to oppose each other;

when a length of the casing in a direction from the first electrode to the second electrode is DB, a length in a direction orthogonal to the direction from the first electrode to the second electrode is LB, a depth from the opening to a bottom surface is PB, and a distance from the bottom surface to the electrodes is d3; and a length of the coupler housed in the casing in a direction from the first electrode to the second electrode is D, a length in a direction orthogonal to the direction from the first electrode to the second electrode is L, and a distance between the power transmission/reception couplers is d2, the following expressions hold true among them:

$DB \geq 1.2 \times D$, $LB \geq 1.3 \times L$, and $PB \geq d3 \geq d2/2$.

3. The wireless power transmission system according to claim 1, wherein the second and the fourth electrode each have an annular shape and are disposed in parallel to oppose each other, the first electrode is disposed in a hollow part of the annular shape of the second electrode, and the third electrode is disposed in a hollow part of the annular shape of the fourth electrode; and at least one of the power transmission coupler and the power reception coupler is housed in the casing, and two electrodes housed in the casing are disposed in the opening of the casing.

4. The wireless power transmission system according to claim 3, wherein when an inside radius of the casing is RB, a depth from the opening to the bottom surface is PB, a distance from the bottom surface to the electrodes is d3, a radius of the electrodes having an annular shape of the coupler housed in the casing is R, a depth from the opening to the bottom surface is P, and a distance between the power transmission/reception couplers is d2, the following expressions hold true among them:

$RB \geq 1.1 \times R$, and $PB \geq d3 \geq d2/2$.

5. The wireless power transmission system according to claim 1, wherein the casing is constituted of aluminum or copper.

6. The wireless power transmission system according to claim 1, comprising a radome constituted of a dielectric on the opening of the casing.

7. The wireless power transmission system according to claim 1, comprising a fixing member fixing the couplers to the casing.

8. A wireless power transmission system transmitting alternating-current power wirelessly from a power transmission device to a power reception device, wherein the power transmission device comprises:

a first and a second electrode which are disposed across a predetermined distance;

a first and a second connection line electrically connecting the first and the second electrode and two output terminals of an alternating-current power generating unit, respectively; and a first inductor residing between the first and the second electrode and at least one of the two output terminals of the alternating-current power generating unit, and the power reception device comprises:

a third and a fourth electrode which are disposed across a predetermined distance;

a third and a fourth connection line electrically connecting the third and the fourth electrode and two input terminals of a load, respectively; and a second inductor residing between the third and the fourth electrode and at least one of the two input terminals of the load, wherein:

at least one of the first to the fourth electrode is housed in a conductive casing having an opening corresponding to an opposing electrode, and a resonance frequency of a power transmission coupler constituted of the first and the second electrode and the first inductor and a resonance frequency of a power reception coupler constituted of the third and the fourth electrode and the second inductor are set to be substantially equal;

the first and the second electrode constituting the power transmission coupler are disposed in parallel to oppose each other across a predetermined distance, and the predetermined distance is less than or equal to $\lambda/2\pi$ as a near field;

the third and the fourth electrode constituting the power reception coupler are disposed in parallel to oppose each other across a predetermined distance, the predetermined distance is less than or equal to $\lambda/2\pi$ as a near field, and the third electrode is disposed in parallel to oppose the first electrode; and at least one of the power transmission coupler and the power reception coupler is housed in the casing, one of two electrodes housed in the casing is disposed in the opening of the casing, and the other is connected electrically to the casing.

* * * * *